(12) United States Patent
Jantunen et al.

(10) Patent No.: US 8,260,324 B2
(45) Date of Patent: Sep. 4, 2012

(54) ESTABLISHING WIRELESS LINKS VIA ORIENTATION

(75) Inventors: Joni Jorma Marius Jantunen, Helsinki (FI); Kimmo Heikki Juhana Kalliola, Helsinki (FI); Antti Paavo Tapani Kainulainen, Espoo (FI)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 11/761,803

(22) Filed: Jun. 12, 2007

(65) Prior Publication Data

US 2008/0311957 A1 Dec. 18, 2008

(51) Int. Cl.
*H04W 24/00* (2009.01)
*G01S 3/52* (2006.01)
*G01S 5/02* (2010.01)
*G01S 5/04* (2006.01)

(52) U.S. Cl. ............... 455/456.6; 455/456.1; 455/457; 342/418; 342/442; 342/417; 342/443; 342/423

(58) Field of Classification Search .......... 455/560, 455/456.1, 456.2, 456.3, 456.4, 456.5, 456.6, 455/457; 342/418, 442, 417, 443, 423, 433
See application file for complete search history.

(56) References Cited

U.S. PATENT DOCUMENTS

| | | | |
|---|---|---|---|
| 4,688,026 A | 8/1987 | Scribner et al. | |
| 5,093,649 A | 3/1992 | Johnson | |
| 5,515,061 A | 5/1996 | Hiltz et al. | |
| 5,812,083 A | 9/1998 | Johnson et al. | |
| 5,815,538 A | 9/1998 | Grell et al. | |
| 6,075,442 A | 6/2000 | Welch | |
| 6,246,376 B1 | 6/2001 | Bork et al. | |
| 6,430,498 B1 | 8/2002 | Maruyama et al. | |
| 6,504,503 B1 | 1/2003 | Saint-Hilaire et al. | |
| 6,529,143 B2 | 3/2003 | Mikkola et al. | |
| 6,778,902 B2 | 8/2004 | Hathiram et al. | |
| 6,807,159 B1 | 10/2004 | Shorey et al. | |
| 6,871,144 B1 | 3/2005 | Lee | |
| 6,944,457 B2 | 9/2005 | Ainikula et al. | |
| 7,353,034 B2 | 4/2008 | Haney | |

(Continued)

FOREIGN PATENT DOCUMENTS

DE 19935921 2/2001

(Continued)

OTHER PUBLICATIONS

U.S. Appl. No. 11/357,165, filed Feb. 21, 2006, Kalliola et al.

(Continued)

*Primary Examiner* — Jinsong Hu
*Assistant Examiner* — Opiribo Georgewill
(74) *Attorney, Agent, or Firm* — Locke Lord, LLP

(57) ABSTRACT

A system for establishing a wireless link from a wireless communication device (WCD) to at least one target device. The process of both identifying the target device and establishing a link to this device may incorporate the orientation and/or movement of the WCD into the procedure in lieu of the extensive use of traditional menu interfaces. A WCD may interpret a combination of orientation and/or movement as an approximate target device location that may be utilized to narrow the total population of all located devices into a subset containing those devices located within of near the approximate target device location. The subset of devices may be formulated and displayed as potential target devices for selection by a user. If any of the potential target devices are known by the WCD, a link may be established automatically.

31 Claims, 18 Drawing Sheets

U.S. PATENT DOCUMENTS

| | | | |
|---|---|---|---|
| 7,692,573 | B1 | 4/2010 | Funk |
| 2003/0206115 | A1 | 11/2003 | Krumm et al. |
| 2003/0235172 | A1 | 12/2003 | Wood |
| 2004/0012524 | A1 | 1/2004 | Couronne et al. |
| 2004/0038645 | A1 | 2/2004 | Reunamaki et al. |
| 2004/0192331 | A1* | 9/2004 | Gorday et al. ............. 455/456.1 |
| 2004/0214527 | A1 | 10/2004 | Lim et al. |
| 2004/0266494 | A1 | 12/2004 | Ruuska et al. |
| 2005/0014468 | A1 | 1/2005 | Salokannel et al. |
| 2005/0020322 | A1 | 1/2005 | Ruuska et al. |
| 2005/0130606 | A1 | 6/2005 | Wang et al. |
| 2005/0148341 | A1 | 7/2005 | Chang |
| 2005/0181726 | A1 | 8/2005 | Gottlieb et al. |
| 2005/0212672 | A1 | 9/2005 | Fry |
| 2007/0001904 | A1 | 1/2007 | Mendelson |
| 2007/0066323 | A1* | 3/2007 | Park et al. .................. 455/456.2 |
| 2007/0141997 | A1 | 6/2007 | Wulff et al. |
| 2008/0228437 | A1* | 9/2008 | Damarla ....................... 702/151 |
| 2008/0231457 | A1 | 9/2008 | Mattice et al. |

FOREIGN PATENT DOCUMENTS

| | | |
|---|---|---|
| EP | 1457911 | 9/2004 |
| GB | 2219471 | 12/1989 |
| WO | 0010029 | 2/2000 |
| WO | 02/073818 A1 | 9/2002 |
| WO | 02073818 | 9/2002 |
| WO | 03100452 A1 | 12/2003 |
| WO | 2004075169 | 9/2004 |
| WO | 2005009020 | 1/2005 |
| WO | 2007025770 | 3/2007 |

OTHER PUBLICATIONS

Krim et al., "Two Decades of Array Signal Processing Research: the Parametric Approach", IEEE Signal Processing Magazine, Jul. 1996, p. 67-91.

Honkanen et al., "Low End Extension for Bluetooth", Sep. 9, 2004, 4 pages, IEEE, Atlanta, GA, USA.

LAN/MAN Standards Committee, "Part 15.4: wireless Medium Access Control (MAC) and Physical Layer (PHY) Specifications for Low-Rate Wireless Personal Area Networks (LR-WPANs)", IEEE Standards, Oct. 1, 2003, p. 1-679, IEEE, New York, NY, USA.

A. Sibille, et al., Circular switched monopole arrays for beam steering wireless communications, Electronics Letters, vol. 33 (7), p. 551-552, Mar. 1997.

A. Chelouah, et al., Angular diversity based on beam switching of circular arrays for HIPERLAN terminals, Electronics Letters, vol. 36(5), p. 387-388, Mar. 2000.

International Search Report for International Application No. PCT/IB2008/051451 dated Oct. 29, 2008.

International Search Report for International Application No. PCT/IB2007/000365 dated Sep. 4, 2007.

U.S. Appl. No. 12/857,968, filed Aug. 17, 2010, Kalliola.

* cited by examiner

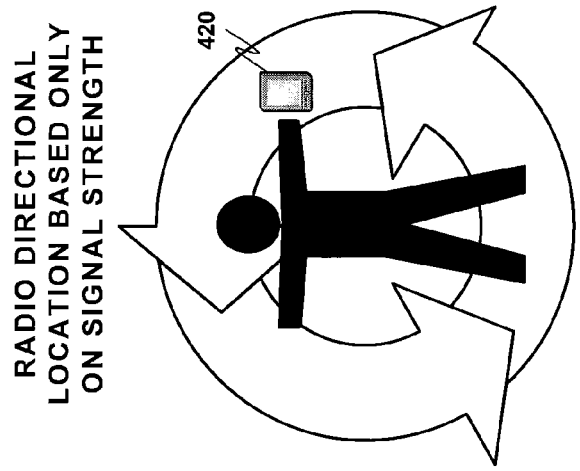
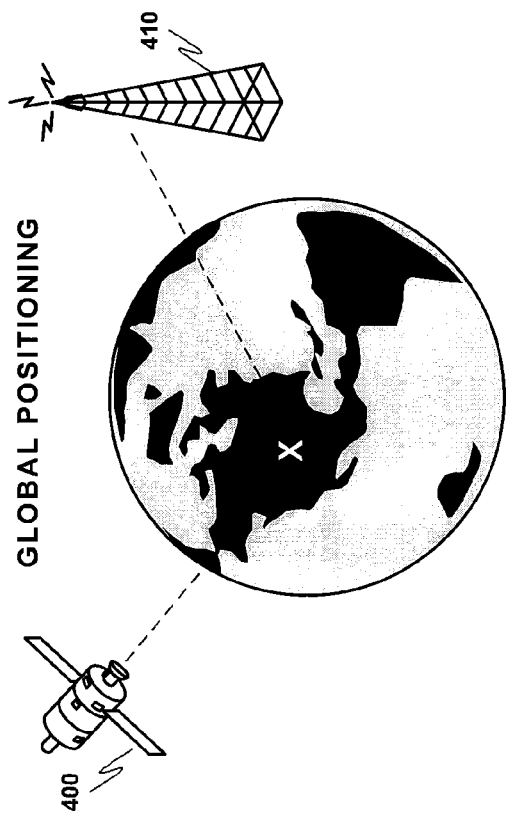
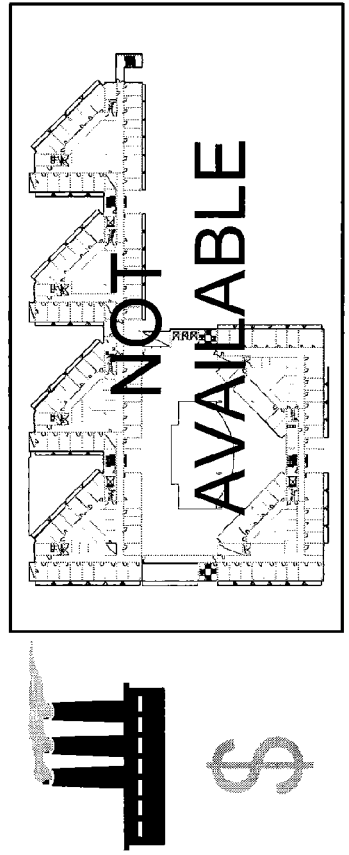
FIG. 4

FIG. 7
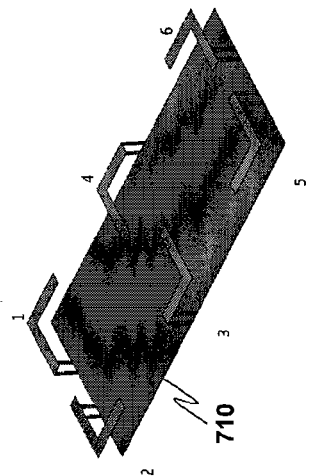
Antenna structure based on PIFA's
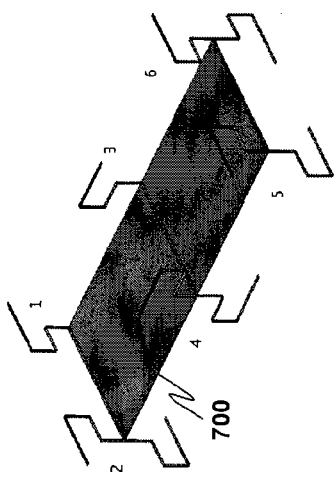
Antenna structure based on meandered dipoles
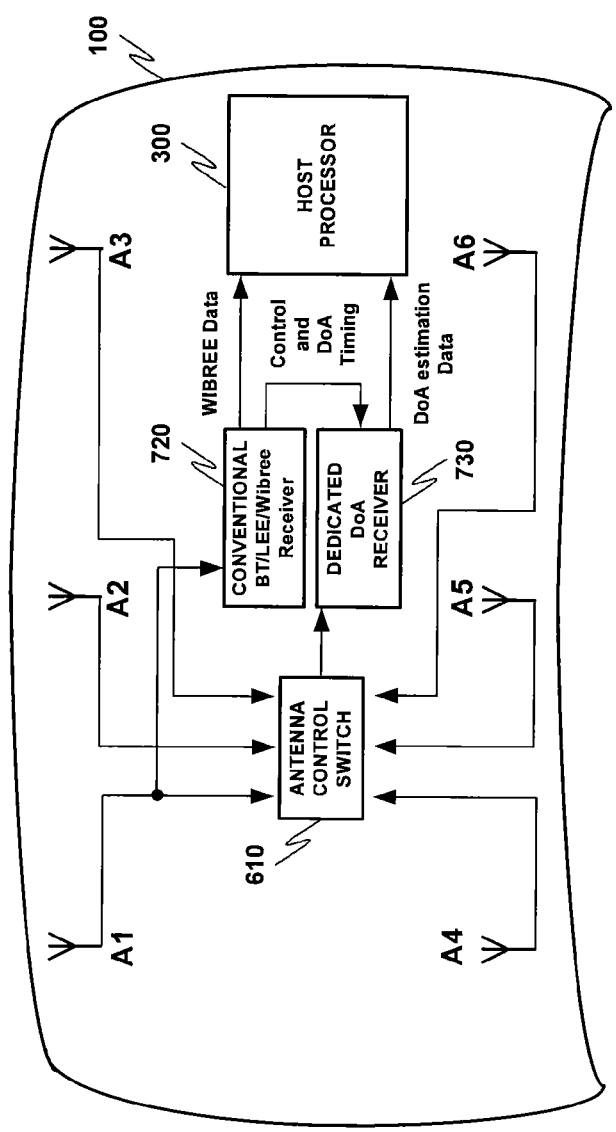

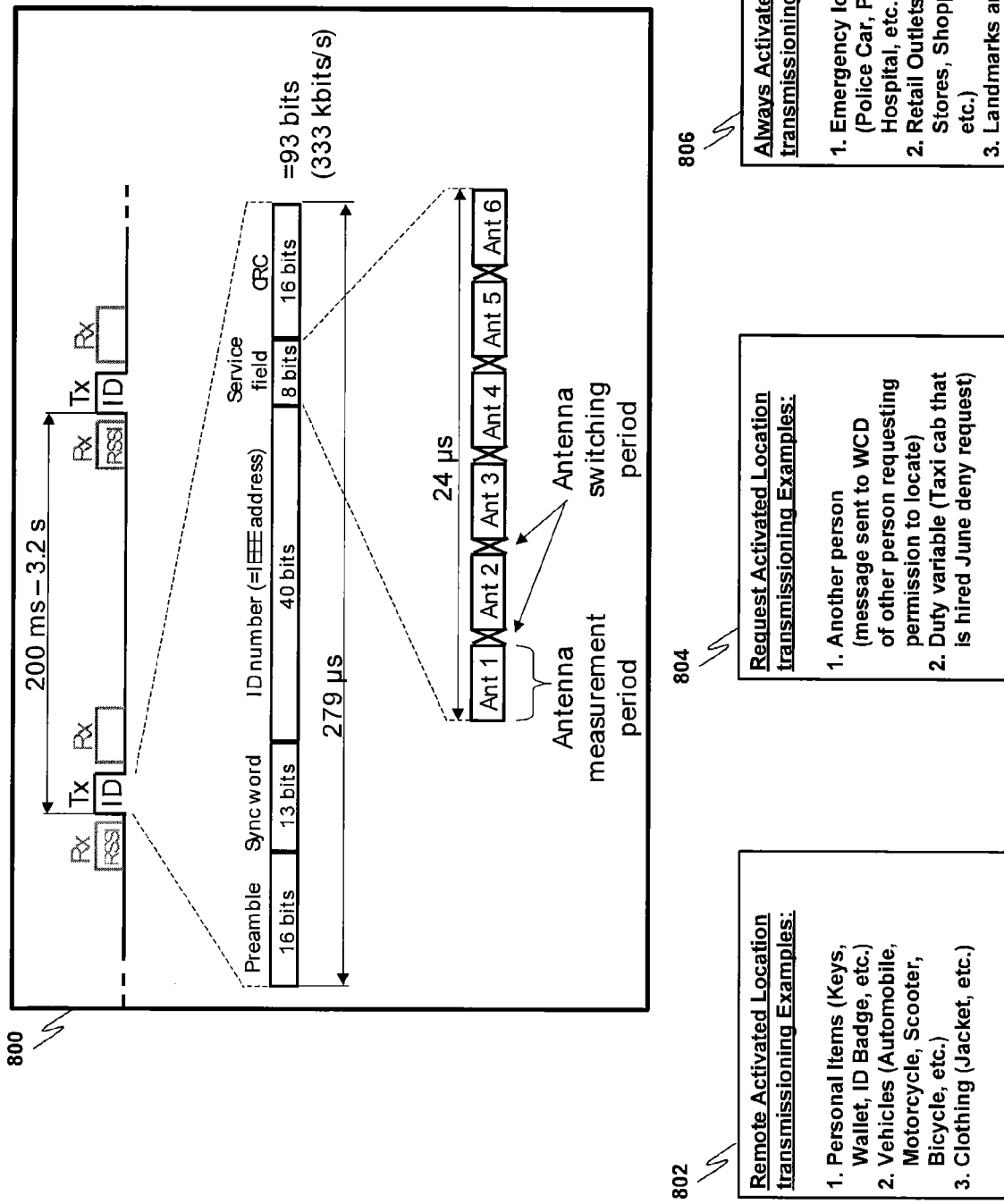

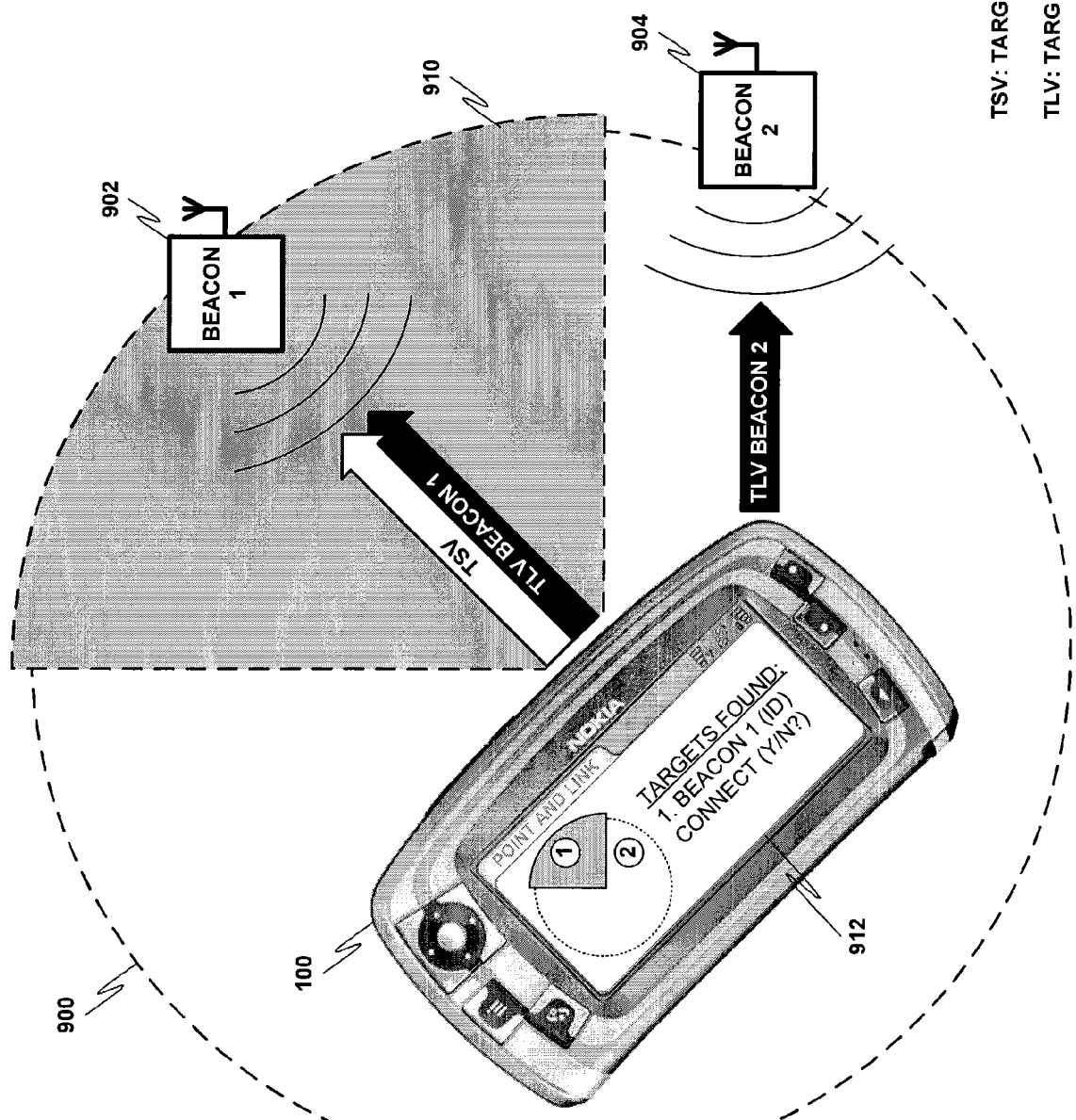

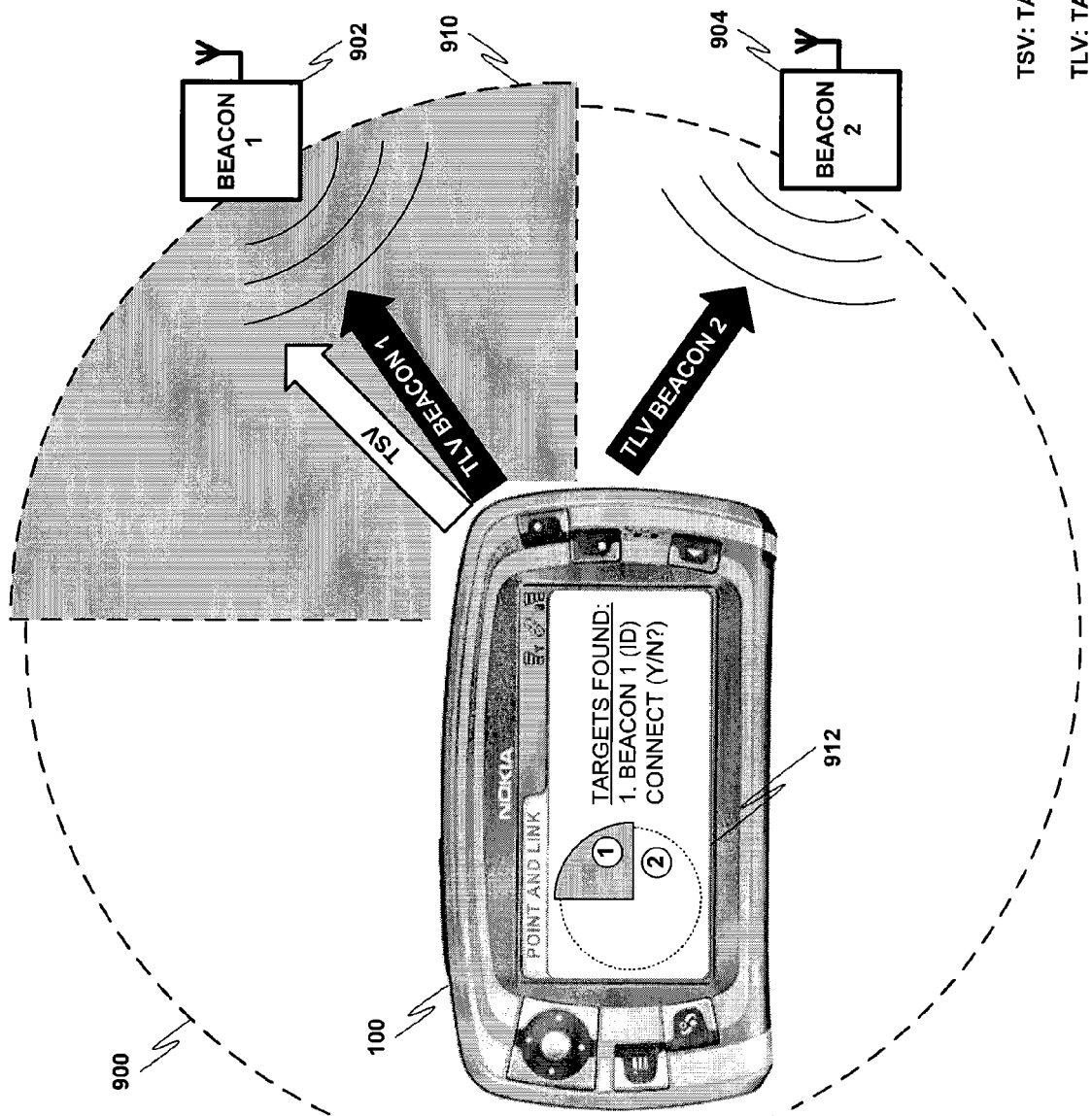

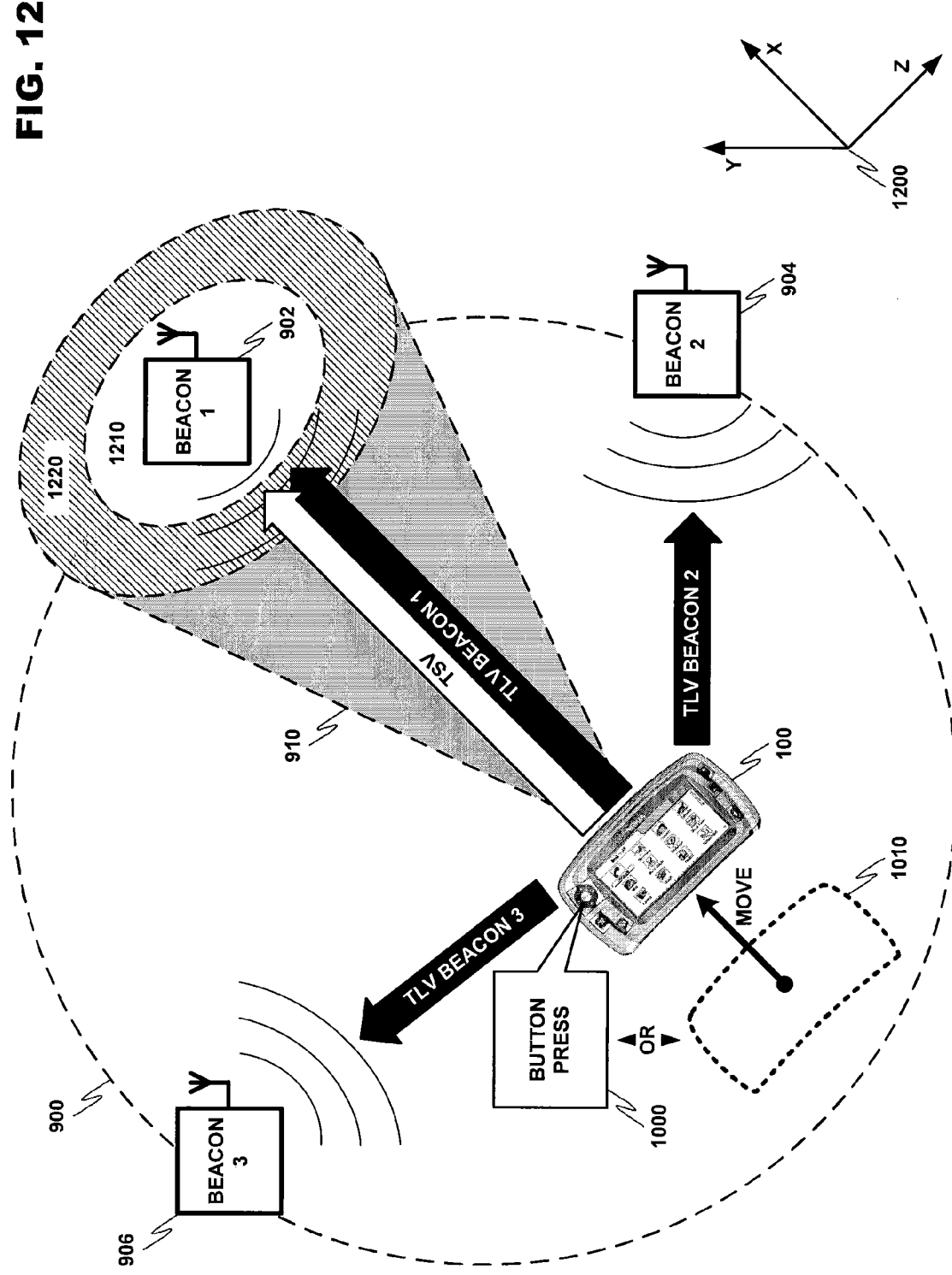

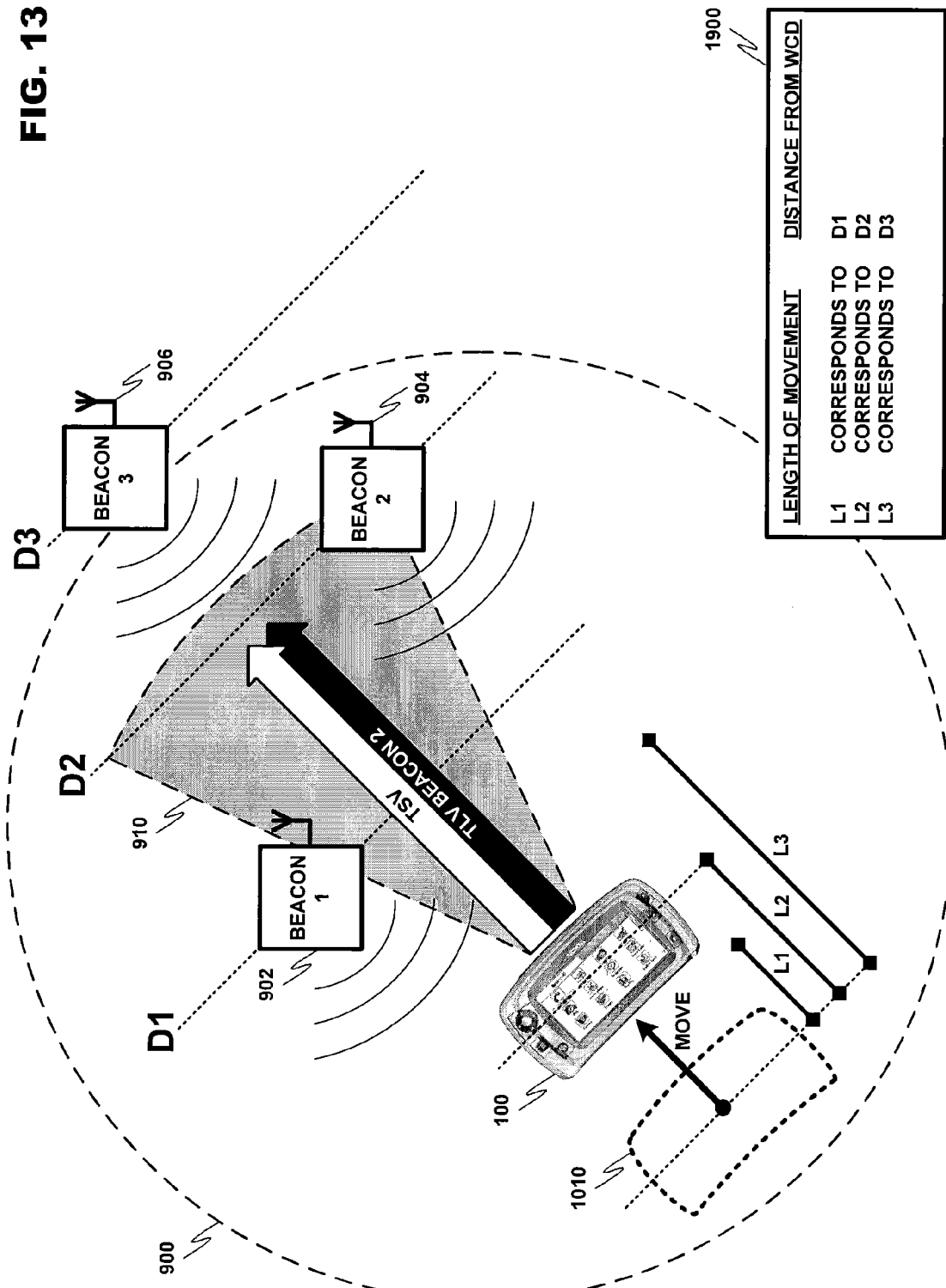

ESTABLISHING WIRELESS LINKS VIA ORIENTATION

BACKGROUND OF INVENTION

1. Field of Invention

The present invention relates to a system for facilitating wireless communication links, and more specifically, for expediting the establishment of a wireless connection to a target device via at least one of an orientation of a wireless communication device.

2. Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless network technologies include WLAN (of which "Wi-Fi" local access points communicating in accordance with the IEEE 802.11 standard, is an example), Wireless USB (WUSB), Ultra Wideband (UWB), ZigBee (802.15.4, 802.15.4a), and UHF RFID. All of these wireless communication technologies have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

While a substantial benefit may be realized in utilizing a device that is enabled to communicate via a multitude of wireless communication media, these advantages may not be fully appreciated if the configuration required for utilizing these resources is overly burdensome. For example, using short-range wireless communication mediums such as Bluetooth™ may involve an inquiry to find a desired device, or target device, from all of the available Bluetooth™ devices currently within transmission range of a WCD. When Bluetooth-enabled devices were first emerging into the marketplace, the establishment of this link may not have been problematic because only users with some technical expertise were operating these devices, and the number of active Bluetooth™ devices was relatively small. However, today people of many different skill levels are utilizing multifunction WCDs. Further, the number of wireless devices operating in any given area has multiplied exponentially, increasing the difficulty that may be experienced in establishing a wireless connection with a single device within this galaxy of wireless devices.

What is therefore needed is an intuitive system and/or method for establishing a wireless network or link between a WCD and at least one other wireless-enabled device. The establishment of this connection should allow a WCD user who is not technically proficient to easily select a device and make a connection. The process of selecting the device should avoid a large amount of keying and/or interacting with various menus in the WCD, and should further be easy to execute so that the establishment of a wireless connection will not be prohibitive to utilizing different wireless-enabled devices and/or alternative wireless communication mediums.

SUMMARY OF INVENTION

The present invention includes at least a method, device, computer program and system for establishing a wireless link from a WCD to another wireless-enabled device. The process of both identifying a target device and establishing a link to this device may incorporate the orientation and/or movement of the WCD into the link establishment procedure in lieu of the exclusive use of traditional menu interfaces. A WCD may interpret a combination of orientation and/or movement to approximate a target device location. This approximate target location may be utilized in combination with a direction-of-arrival estimation to narrow the total population of wireless-enabled devices within communication range of the WCD into a subset containing only those wireless-enabled devices located within or near to the approximate target location. This subset may be formulated and displayed as potential target devices for selection by a user. If any of the potential target devices are trusted by the WCD, a link may be established automatically.

In at least one example of the present invention, a target selection vector that defines the direction towards a device to which a wireless link is desired may be determined as a fixed direction relative to a WCD coordinate system, and also, as the direction in which the WCD is pointing relative to an absolute coordinate system. In further alternative embodiments, the target selection vector may be defined by the user by moving the WCD, or it may change according to the application and/or other information related to the state of the WCD.

In an example scenario, a user of a WCD may first define the target selection vector in absolute coordinate system by, for example, pointing the WCD towards the direction of a target wireless device. Further, target location vectors defining a direction or location of each wireless-enabled device in the WCD coordinate system and within communication range of the WCD may be determined by direction-of-arrival estimation. The total population of located devices may then be narrowed to a subset of potential target devices within or near the approximate target location by comparing the fixed target selection vector to the various device target location vectors in the WCD coordinate system. In an alternative embodiment of the present invention, a user may first press a key or button to initiate a target location vector determination process that finds the approximate locations of wireless-enabled devices in WCD coordinate system and in range. A user may then select a device with which to connect by turning or moving the WCD towards the direction of the desired target device. In the case of turning, the target location vector(s) may be realigned according to the new orientation of the WCD by using a rotation sensor or performing a new target location vector determination process. Depending on the capabilities of the WCD (e.g., processing power, number of antennas, etc.), a two-dimensional or three-dimensional direction-of-arrival estimation may be employed.

The subset making up the group of wireless-enabled devices located within or near the approximate location defined by the target selection vector may further be placed in order based on the probability of actually being the target device. For example, these devices may be ordered from closest to furthest away from the approximate location defined by the target selection vector. This subset of all discovered devices may then be displayed for a user on the WCD. If a potential target device is deemed trusted or known (e.g., it has already been paired with the WCD in the case of Bluetooth™ communication), a wireless link may be automatically established between the trusted device and the WCD in order to expedite link establishment.

DESCRIPTION OF DRAWINGS

The invention will be further understood from the following detailed description of a preferred embodiment, taken in conjunction with appended drawings, in which:

FIG. 4 discloses exemplary forms of location-finding and directional systems currently employed to determine direction and/or location.

FIG. 7 discloses exemplary antenna arrangements and an alternative structural description for receiving a position-indicating transmission in accordance with at least one embodiment of the present invention.

FIG. 8 discloses an exemplary position-indicating transmission and different transmission strategies in accordance with at least one embodiment of the present invention.

FIG. 9A discloses an exemplary target selection vector and target location vectors in accordance with at least one embodiment of the present invention.

FIG. 9B discloses another exemplary target selection vector and target location vectors in accordance with at least one embodiment of the present invention.

FIG. 12 discloses an example of three-dimensional direction-of-arrival determination employed in accordance with at least one embodiment of the present invention.

FIG. 13 discloses an example of utilizing movement to indicate approximate distance to a target device in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks

Figure 1:
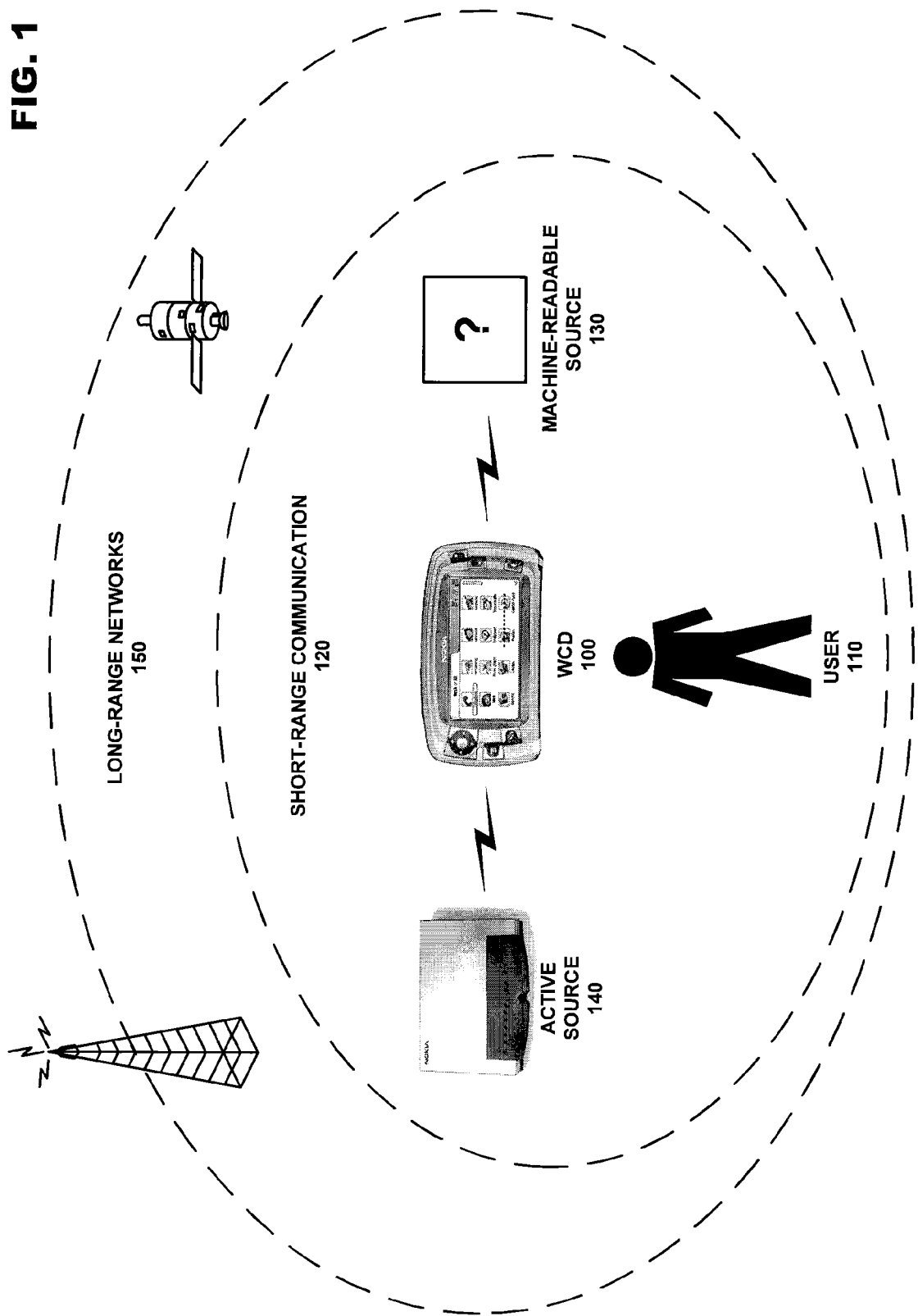
FIG. 1 discloses an exemplary short-range to long-range wireless communication environment usable to describe at least one embodiment of the present invention.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In FIG. 1, user 110 possesses an exemplary WCD 100. This device may be anything from a basic cellular handset to a more complex device such as a wirelessly enabled palmtop or laptop computer. Various types of communication may be supported by WCD 100, including the depicted example classifications of short-range communication 120 and long-range networks 150. Short-range communication 120 may include a multitude of devices communicating over various wireless mediums. These devices and mediums may be selected for certain scenarios based on their characteristics, such as operational range, speed, error correction, complexity of implementation, security, etc. For example, machine-readable sources 130 may include various transponder-type interactions wherein normally only the scanning device requires its own power source. WCD 100 scans source 130 via short-range communication. A transponder in source 130 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. For example, short-range active sources 140 may include applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 may be used to provide virtually uninterrupted communication coverage for WCD 100. Land-based radio stations or satellites may be utilized to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
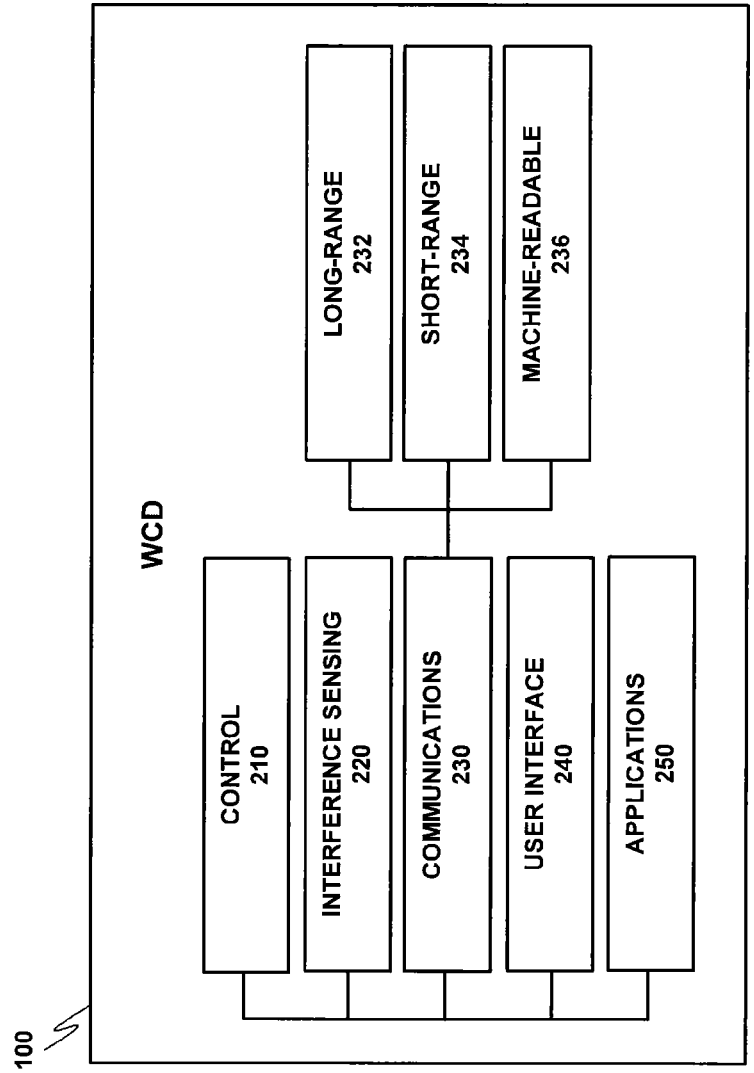
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable communications module 236. Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may include visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may incorporate all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
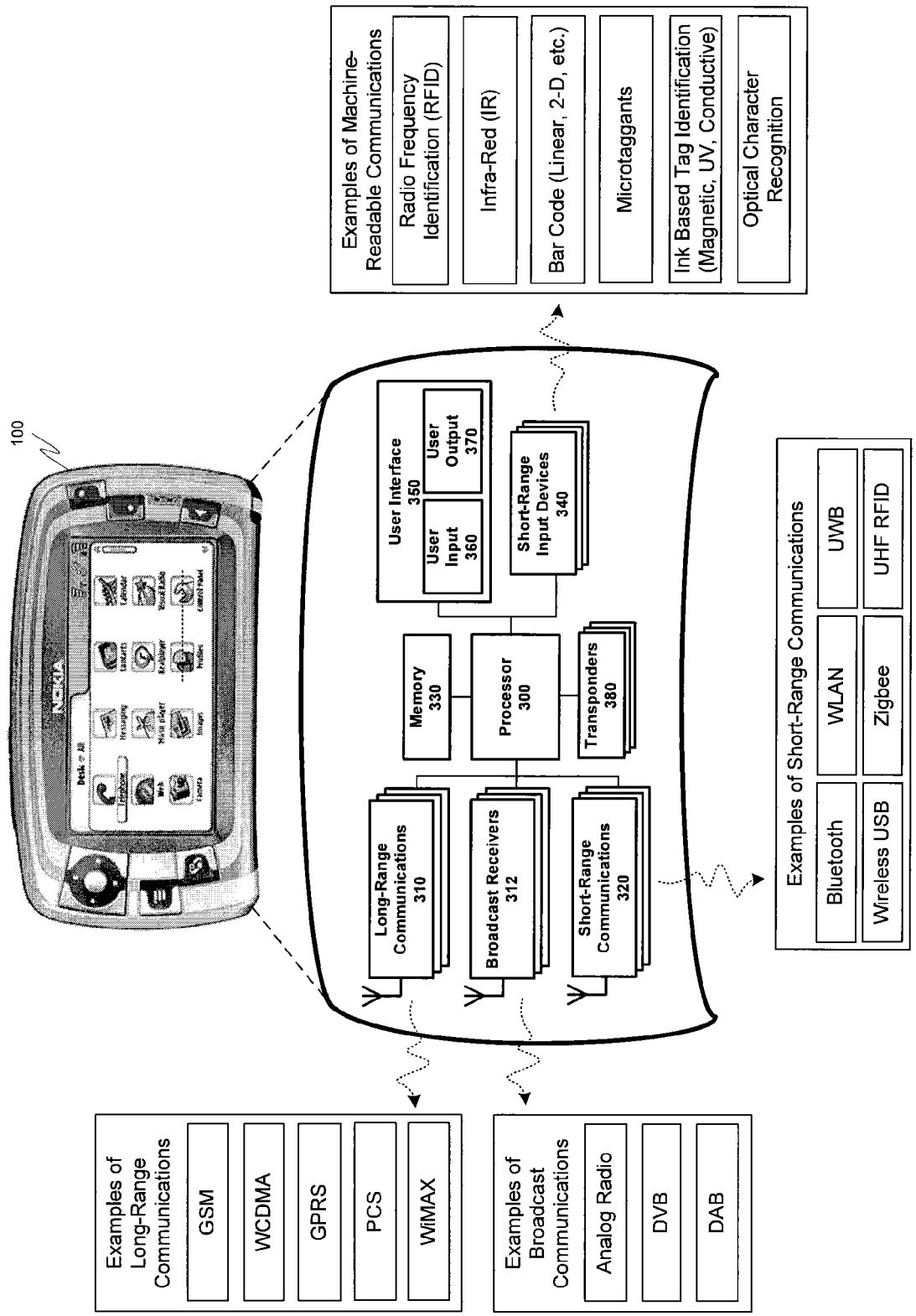
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Further, the wireless media specifically-identified above are presented only for the sake of explanation in the disclosure. The present invention is not limited to the aforementioned types of wireless communication media, and may be applicable to any wireless communication medium.

As a subset of long-range communications 310, or alternatively operating as an independent module separately connected to processor 300, transmission receiver 312 allows WCD 100 to receive transmission messages via mediums such as Digital Video Broadcasts (DVB). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (e.g., including processes related to the interpretation of Universal Product Code labels, also known as "UPC" labels), and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity (this specific interface has been omitted from the figure in order to provide a simplified drawing).

It is important to note that the scope of the functionality of an exemplary mobile device utilized in accordance with at least one embodiment of the present invention need not have all of, or could indeed add additional features to, the previously discussed components and interfaces. The mobile device previously described above is but one example of a usable device.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components, or additional components, may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Current Systems for Providing Location-Finding or Directional Information

There are some examples of location-finding or direction-finding systems on the market today. In FIG. 4, two varieties are disclosed which may represent two extremes in this technology area. These two technologies have been implemented to serve very different purposes, and as such, have different strengths and weaknesses.

Global positioning systems may deliver a precise geographic location (e.g., latitude and longitude measurement) to a user. Traditionally, these systems have been mounted in vehicles, but now smaller compact versions are available that may be carried by a pedestrian. These systems use satellites 400 or terrestrial radio networks 410 to determine the location of a receiver in global coordinates, such as longitude and latitude. The obvious advantage of these systems is their ability to determine the absolute location of a GPS device. Most commercial devices may figure the correct position of a person within a few meters.

However, while these systems deliver global location information, there are some limitations to this technology. GPS is only usable outside due to the need to receive a signal from satellite 400. Network assisted GPS (AGPS) systems also have limited indoor coverage, but the performance is typically not adequate. Precision can be intentionally limited by government regulation due to security concerns regarding how a location device may be maliciously used if too accurate. GPS positioning signals are also subject to multipath (reflection) or environmental interference, especially in dense urban environments, which tends to cause location determining errors. In order to correct this problem, differential systems may be employed combining both satellite 400 and ground based systems 410, however, these systems are more costly to operate, the additional cost of which may be passed on to the consumers. Further, the software required to implement GPS directional systems may be complex, requiring substantial hardware support in order to function properly.

On the other end of the spectrum is single antenna radio location based only on signal strength. Tracking device 420 may be tuned to the frequency of one or more known signal emitters. In the simplest implementation an omnidirectional antenna is used to find any targets in the vicinity by receiving their signals, in order to indicate their presence and possibly the location of the tracking device. To improve the accuracy, a unidirectional antenna on tracking device 420 may be used to measure the strength of each received signal, wherein the reception strength is indicated using a visual or audio method. The user physically moves the device in a sweeping pattern and monitors the signal strength indicator. The direction of strongest signal reception is deemed to be the direction towards the target. RadarGolf™ is an example of this type of device. Also more sophisticated direction and distance tracking devices exist, such as Bluespan's® Ion-Kids®, which are based on proprietary technology.

While this type of system is very economical to operate, it only has limited applications. Tracking device 420 may locate only known objects over relatively short range. The user of the device must physically sweep the device back and forth in order to determine the target direction. There is no way to determine the absolute position of the target or tracking device 420 (e.g., there is no way to estimate longitude and latitude of either tracker or target). In addition, depending on the technology, tracking device 420 is subject to electromagnetic and environmental interference, and would not be effective where this type of interference abounds, for example, in a building.

IV. A Multiple Antenna Direction of Arrival (DoA) Tracking System

At least one embodiment of the present invention employs signals received on multiple antennas in a Direction of Arrival ("DoA") signal processing scheme in order to determine a relative direction to a target from WCD 100. In this technique, the direction of arrival of the incident signal (e.g., the position-indicating transmission) is resolved based on the phase and possibly amplitude differences of signals received by the elements of an antenna array. In the simplest method, historically known as the Bartlett Beamformer, the normalized received power in each array look direction ($\theta$) is calculated using the following relationship:

$$P(\theta) = \frac{a^H(\theta)Ra(\theta)}{L^2} \quad (1)$$

Wherein in equation (1), $a(\theta)$ is a so called steering vector of the array and R is the spatial covariance matrix of the received signal. L is the number of elements in the antenna array. $a^H$ denotes a conjugate transpose of the matrix a. The direction giving the highest power is then assumed to be the direction of the target.

The covariance matrix R is obtained as:

$$R = E\{x(t)x^H(t)\} \quad (2)$$

where x(t) is the vector of signals received from the antenna elements as a function of time t.

The elements of the steering vector $a(\theta)$ are the output signals of the array elements, when it receives a plane wave from direction $\theta$. It is defined as:

$$a_n(\theta) = g_n(\theta) \cdot e^{-jkr_n \cdot u_r(\theta)} \quad (3)$$

in which $g_n(\theta)$ is the complex radiation pattern of element n, k is the wave number (defined as $2\pi/\lambda$ where $\lambda$ is the wavelength at center frequency), $r_n$ is the location vector of element n, and $u_r$ is the radial vector towards the incident wave direction $\theta$. In a simple case of a linear array of identical and equally spaced elements the steering vector simplifies to:

$$a(\theta) = g(\theta)[1 e^{-jkd \cos \theta} \ldots e^{-j(L-1)kd \cos \theta}]^T \quad (4)$$

in which d is the inter-element spacing of linear, equally spaced antenna elements in the array. $\theta$ is the angle between the line connecting the linearly located antenna elements and the incident wave direction.

In a small handheld device the radiation patterns of the elements are typically not identical because they are affected by the metallic chassis of the device. The elements may also be differently oriented due to space limitations in the device. In this case, either Eq. (3) must be used, or the steering vector can also be directly measured in a calibration measurement, or it can be computed using electromagnetic simulation tools.

The DoA estimation accuracy decreases in the presence of multipath propagation or noise. In the noisy multipath radio propagation channel the accuracy can be increased by improving the resolution of the array through increasing its size by adding more antenna elements. In addition, the distance between any two antenna elements in the array should not exceed half a wavelength to obtain unambiguous DoA estimate.

Multipath radio propagation causes fading that can lead to rapid changes of the DoA estimates and temporary mispointings. To overcome the problem one aspect of the invention uses a tracking algorithm. It is based on keeping a register of several DoA estimates and choosing the one with highest average power to be selected as the actual output.

The DoA estimation algorithm calculates an Azimuth Power Spectrum (APS), e.g., the signal power received from azimuth directions. The tracking algorithm extracts the maxima from the azimuth power spectrum. It keeps track of e.g. the 5 strongest directions. If one of the newly extracted maxima is close (e.g. within 10 degrees) to one of these directions, then the signal power and the direction is added to the tracked direction. If not, the new direction is tracked. All the signal power values of the tracked directions are filtered using a forgetting curve and the DoA of each tracked direction is calculated using a weighted average of the extracted directions for this tracker. After each tracker update, tracked directions that are closer than e.g. 10 degrees are merged and the number of tracked directions is reduced to the five strongest directions. Without using this tracking algorithm, the strongest maximum would be chosen to be the DoA, which might lead to rapid changes in the estimated DoA due to fading.

Figure 5:
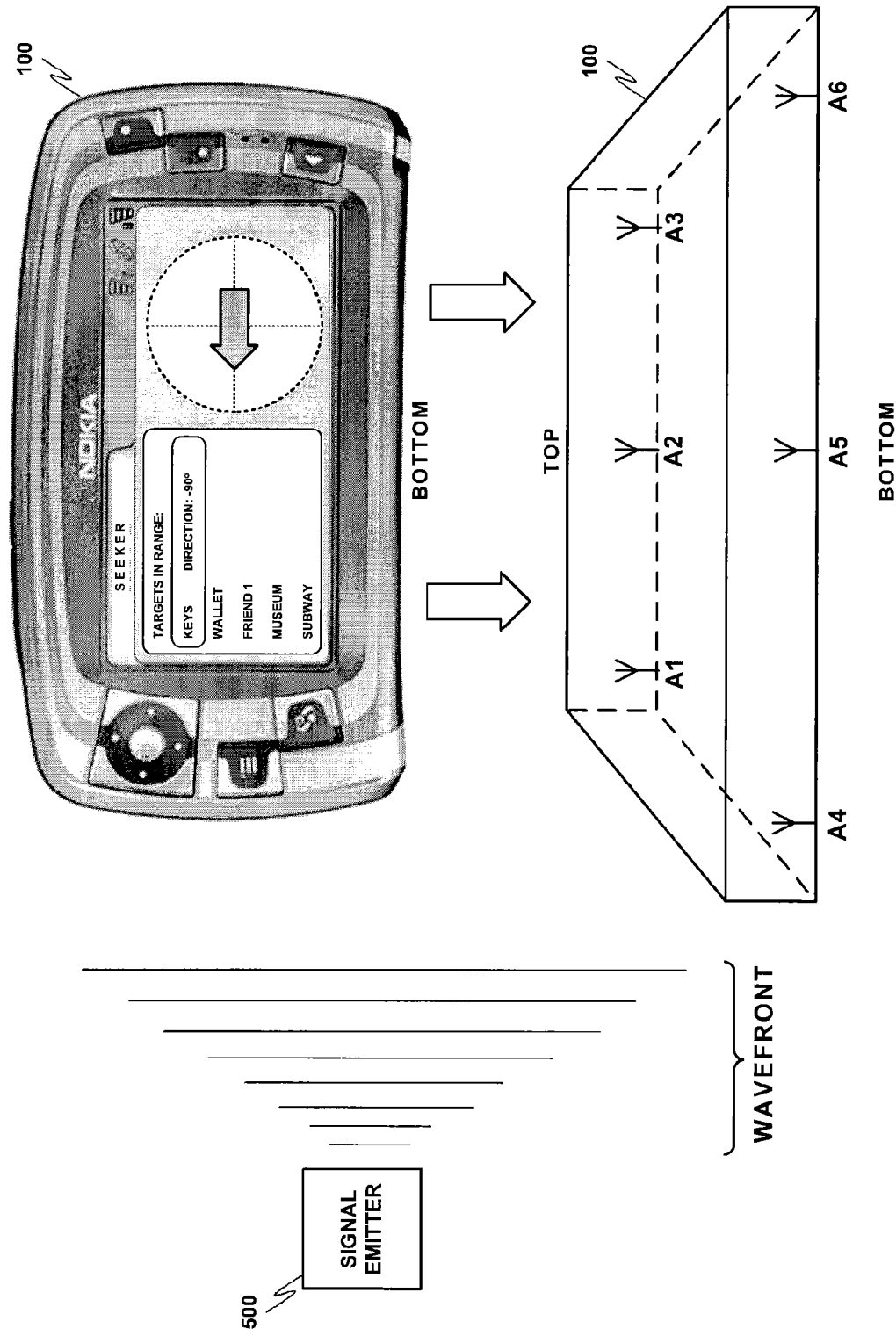
FIG. 5 discloses an exemplary wireless communication device including integrated direction-finding features in the form of an antenna array in accordance with at least one embodiment of the present invention.

FIG. 5 discloses an exemplary WCD 100 configuration usable with the present invention. In addition to the elements and features already disclosed in FIGS. 2 and 3, the present invention may also include an antenna array. A simplified three-dimensional transparent view of WCD 100 is shown below the exemplary exterior picture of the device 100. The transparent three-dimensional view includes at least antennas A1-A6. The number of antennas doesn't have to be six, but it can be any number larger than one. The placement of antennas A1-A6 may be within the outer housing of WCD 100 to form an array such as the one shown. The array may provide directional field sensing that is interpreted into a direction for display on WCD 100. Signal emitter 500 may emit a position-indicating transmission that is receivable via the antenna array. The placement and orientation of these antennas may allow a user to hold WCD 100 in an horizontal orientation, wherein the display faces upward towards the sky. As will be seen, this orientation lends more naturally to a pointer display indicating direction, such as in the use of a traditional compass when orienteering.

In another example (not shown) the antenna array and/or support circuitry may be housed within an outside component that may be removably attached to WCD 100. This exterior component or attachment may be connected when user 110 wants to determine direction or location, and its connection may automatically signal WCD 100 to enter a position or direction finding mode. It is important to note that if the antenna array is housed in an attachable exterior unit, that the orientation of the exterior unit with respect to WCD 100 would be a fixed, predetermined orientation with respect to the housing of WCD 100 in order to establish a known orientation for the antenna array. In this way, the antenna array will always be in the same (or a known) configuration when attached to WCD 100.

FIG. 5 also includes an example display shown on WCD 100 that is viewable by user 110. This display may be implemented in different configurations depending upon the application to which it is applied. In this example, the display shows both a list of possible target objects and an arrow pointer. There can be one or multiple active signal emitters 500 within one area at the same time. Multiple beacons can share the same communications medium by using a multiple access method (code, frequency or time). The "KEYS" target object is currently selected. This object is also represented in FIG. 5 as by signal emitter 500, which may be included as a keychain connected to a set of keys. Since the keys object is selected, the WCD 100 will attempt to define the relative direction towards the target designated as keys. The display shows the directional arrow pointing in the direction of the keys, and gives a relative direction measurement towards the keys of −90°. As the user moves toward the selected target, WCD 100 will continuously measure the signal of the target device and will update the display accordingly so that the arrow and the directional measurement continue to indicate the relative direction toward the keys.

Figure 6:
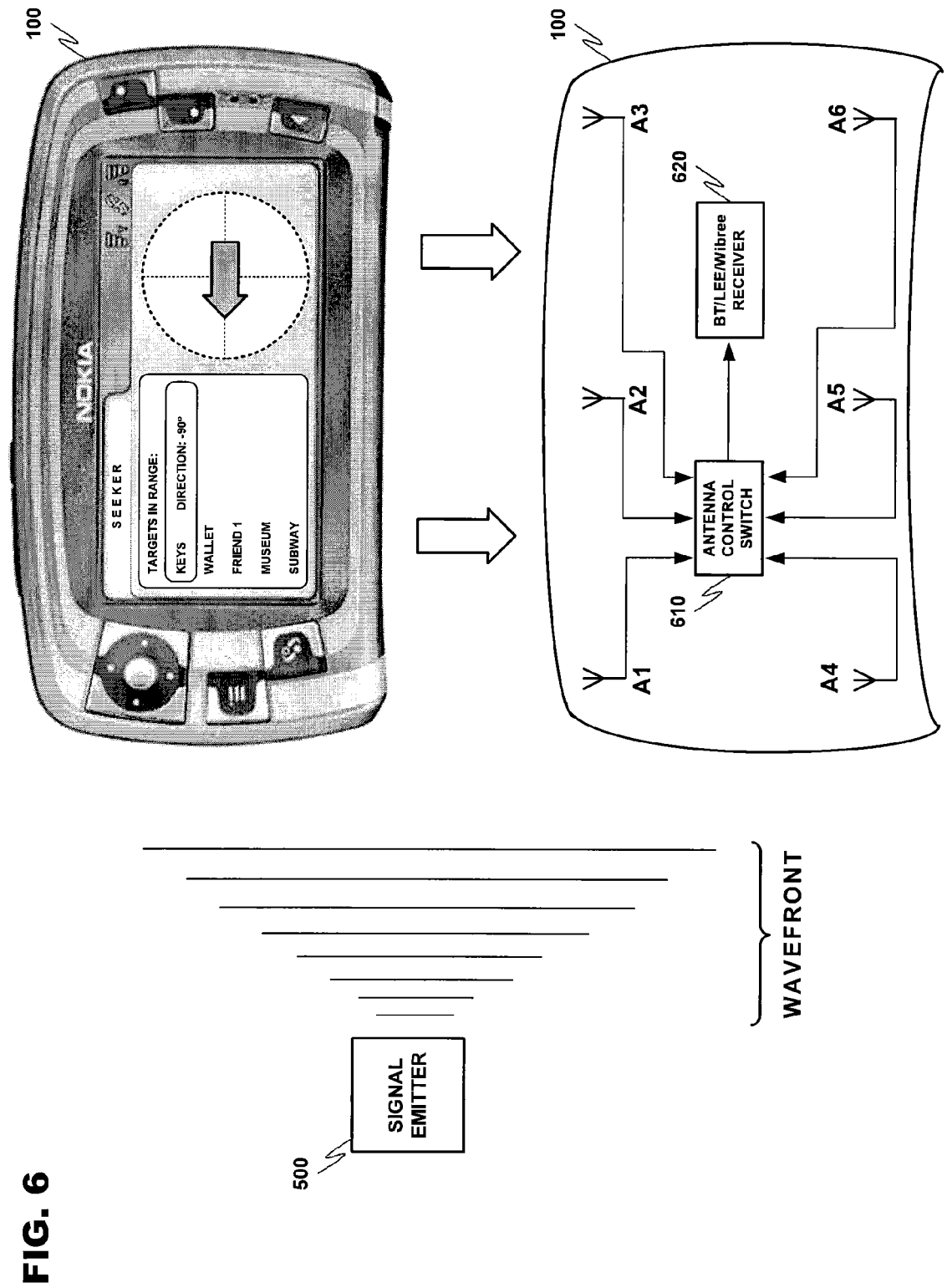
FIG. 6 discloses an exemplary structural description for direction-finding features usable for receiving a position-indicating transmission in accordance with at least one embodiment of the present invention.

FIG. 6 includes a structural diagram of WCD 100. Again, WCD 100 includes any and or all of the elements and features previously disclosed in FIGS. 2 and 3. In FIG. 6, additional elements and features are included that may be composed of stand-alone devices, or may be emulated by combinations of hardware and software present in WCD 100. Antennas A1-A6 may be coupled to antenna control switch 610. Control switch 610 multiplexes the antennas so that one receiver 620 may monitor incoming transmissions from all of the antennas. Signals received on antennas A1-A6 determine the relative direction to a target from WCD 100. The direction of arrival of the incident signal (e.g., the position-indicating transmission) is resolved based on the phase and possibly amplitude differences of the signals received by the respective antennas A1-A6. Control switch 610 sequentially feeds the signal from each antenna to the receiver 620, where the Direction of Arrival ("DoA") signal processing operates on the signal phase and possibly amplitude information to determine a relative direction to a target from WCD 100. This information is fed to receiver 620. Depending on the technology used in the switch, for example GaAs FETs vs. PIN diodes, the switch may operate at different speeds. In view of present technology, it appears that a 10 μs scan time for all antennas is conceivable. Fast switching time is beneficial because it allows DoA estimation from short transmissions and does not set high requirements for the stationary of the radio channel.

In at least one embodiment of the present invention, receiver 620 may be a receiver for Bluetooth™, Bluetooth™ Low End Extension (BTLEE), Wibree™, etc. BTLEE and Wibree™ are based on the Bluetooth protocol, but have been refined to be more suitable for simpler wireless devices. These wireless communication media allow low end devices to communicate with a significantly lower power requirement. BTLEE or Wibree™ may be implemented in chip form to make Bluetooth™ implementation in low end devices more economical. The use of BTLEE or Wibree™ may be more appropriate for the location of personal items. A BTLEE or Wibree™ chipset may be incorporated into a keychain or into the lining of a wallet or garment to allow locating via wireless communication, as will be explained below. BT/LEE/Wibree™ receiver 620 receives signals multiplexed from Antennas A1-A6 and uses this information to determine relative direction using DoA signal processing as previously described. The receiver may also, in some cases, receive information contained within the position-indicating transmission. In these cases the determination of direction and the reception of information carried within the signal may be delayed as the primary receiver 620 attempts to multitask both information reception and DoA determination. This situation may be cured by the further example disclosed in FIG. 7.

The example structural configuration of FIG. 7 separates the responsibility of determining DoA determination and BT/LEE/Wibree™ reception into two separate receiving modules. Antenna A1 is directly tied to BT/LEE/Wibree™ receiver 720 so that information may be received real-time from the position-indication transmission for immediate decoding. As will be discussed later, this information may include identification information announcing that the device is a possible target, identification of the target and other target related data. Dedicated DoA receiver 730 may then be free to concentrate on deriving the time and spacing relationship between the reception of the position-indicating transmission at the various antennas in the antenna array, which is used to determine the relative direction of the object from WCD 100. The information received by both devices may be synchronized, for example, by control and DoA timing information sent from BT/LEE/Wibre™ receiver 720 to DoA receiver 703. Further, both receiving devices may then forward information to central processor 300 which may combine, process, and format the information for display on WCD 100. Although FIG. 7 shows two receivers 720 and 730, alternative embodiments may include more than two receivers. In other examples of the present invention, receivers may also share some components, such as a VCO or synthesizer.

FIG. 7 also discloses two exemplary antenna configurations usable in at least one embodiment of the present invention. These examples of antenna configurations as shown at 700 and 710 may be implemented to improve signal reception and directional indication in the device. The more appropriate antenna configuration will depend on a variety of factors including the size of the device, the composition (e.g., materials, layout, complexity, etc.) of the device, the antenna radiation characteristics required for each antenna, antenna spacing, etc.

V. The Directional Signal

FIG. 8 discloses the makeup of an exemplary position-indicating transmission and different types of position indicating signals. Signal description 800 includes an example frame from a BTLEE transmission. While BTLEE has been used for the sake of example, any of the aforementioned wireless communication mediums may also be applicable, such as Wibree™, Bluetooth™, etc. Initially, the transmission must be identified as a position-indicating transmission. The 16 bit preamble may include a code (e.g., 1010101010101010) that is used to indicate the beginning of the packet and to synchronize the receiver. This indication allows WCD 100 to begin measurement so that when the 8 bit service field is in transmission, one or both of the preamble and the service field may be measured by antennas A1-A6 in WCD 100. The transmission 800 may also include identification information for the position-indicating transmission device, or other device target related information as will be described below.

In addition, different types of position-indicating transmission strategies as disclosed in FIG. 8. Remotely activated location transmission 802 may be employed by a target whose signal emitter 500 may be limited by low power concerns. These devices, such as battery-operated transmitters in a keychain, in a wallet, embedded in an ID badge, mounted in a vehicle such as an automobile, motorcycle, scooter, bicycle or in a piece of clothing, may be activated remotely by a user as needed. For example, the device may operate in a lower power or power conservation mode until a message is received instructing a device to activate the position-indicating transmission signal. This message may be received by any of the aforementioned wireless mediums such as via a Bluetooth™ message. Alternatively, signal emitter 500 may include a transponder, activated by a scanning signal from WCD 100. This scanning signal may be, for example, a UHF RFID signal. This signal may activate a transponder in a 5-10 meter range, and the transponder may respond with a signal that can be used to determine the object's relative position, or may in turn trigger another subsystem in signal emitter 500 to transmit the position-indicating transmission.

In 804, the relative direction towards devices that require a request to activate may be determined. These are typically powered devices that are in the possession of another user. For example, User 110 may want to locate a friend that user 110 believes to be in the immediate area. User 110 may send a message to the friend's WCD requesting an activation of a position-indicating transmission. This message may occur via any of the long-range mediums (for example, via SMS) or any of the short-range mediums previously discussed. Depending on whether the friend is familiar with user 110, or for other security-related reasons, the friend may accept or deny the request to activate the position-indicating feature in their WCD. If the friend declines, a message is returned to WCD 100 that indicates the friend has refused the locating request. Alternatively, the friend may accept the request, activate their location beacon and WCD 100 may receive the position-indicating transmission. This feature may be utilized for commercial features as well. WCD 100 may indicate that there is a taxi cab in the immediate area. User 110 may send a message to the taxi requesting to hire the cab and position indication. If the taxi is already hired or on a break, the driver may refuse the request, or ignore it. On the other hand, if the driver is looking for a fare he may accept the request, the relative position of the taxi being displayed in WCD 100 with other relevant information such as fare information.

A third type of target may include always active position-indicating beacons 806. The signal emitters in these target beacons may include expanded range externally powered devices (e.g., Bluetooth™ access points). WCD 100 may receive signals from these position markers so that user 110 may locate desired services. For example, police cars, ambulances, hospital emergency rooms, etc. may utilize always active beacons 806 so that their signal may be received by people seeking help (e.g., in an emergency). Otherwise, always-active beacons 806 may also be utilized to indicate the direction towards short-range wireless access points for connecting to a WLAN (e.g., Internet) and other places of interest, such as historical landmarks, commuter transportation (e.g., buses and trains), restaurants, stores and entertainment venues.

VI. Establishing a Link Through Orientation and/or Motion

As described above, different types of beacons may be employed depending on the usage scenario. However, locating a user, destination, etc. via a beacon signal is but one example of benefits that may be realized through embodiments of the present invention. Further actions may occur after a device is located, such as establishing a wireless link to the located device. A wireless link may be established, for example, in order to share or exchange files (e.g., business cards, music, pictures, etc.). Linking to a device based on its location may be useful for unskilled device users, or those that don't want to use traditional menu interfaces. In accordance with at least one embodiment of the present invention, a user may simplify the link process (e.g., by pointing WCD 100 towards the device to which a connection is sought and pushing a button).

FIG. 9A discloses an example of defining a target selection vector and target location vector determination in accordance with at least one embodiment of the present invention. In this scenario user 110 may desire to have WCD 110 connected to beacon 1 902. Traditionally, for example in the instance of a Bluetooth™ link, WCD 100 would first perform an inquiry to discover all of the Bluetooth-enabled devices within transmission range. This process would then necessitate user 110 scrolling through a list of all these devices in order to select the target device. While only two devices (e.g., 902-904) are shown in the example, in reality many more may exist, which would expectedly make the establishment process more burdensome. However, if a user could reduce the number of potential target devices by indicating a location for a target device, then this process may become easier.

The exemplary process in FIG. 9A reduces the number of potential target devices by using a direction toward the device as a criterion for selection. Circle 900 may represent the range of coverage for discovering devices via a standard wireless discovery process. However, user 110 may reduce this range by defining a target selection vector (e.g., TSV in FIG. 9A) corresponding to the location of the device to which connection is desired. In this example, the target selection vector may be fixed in a coordinate system relative to WCD 100, which may be further correlated to an absolute coordinate system, and more specifically, to the direction in which WCD 100 is pointing during the target location vector determination process. Target location vectors (e.g., TLV in FIG. 9A) may be determined based on a direction-of-arrival estimation. The target location vector for each device may then be compared to the target selection vector in WCD coordinate system in order to select discovered devices that are potentially the target device from all of the other located devices. These devices, for example, may then be displayed graphically and/or textually on display 912 of WCD 100.

The exemplary process in FIG. 9A may reduce the number of potential target devices by using a direction toward the target device as a criterion for selecting potential target devices. Circle 900 may represent the full range of coverage for discovering devices via a standard wireless discovery process. However, user 110 can narrow this range by defining a target selection vector (e.g., TSV in FIG. 9A) corresponding to the location of the device to which connection is desired. In this example, the target selection vector may be fixed in a coordinate system relative to WCD 100, which then may correspond in absolute coordinate system to the direction in which WCD 100 is pointing during the target location vector determination process. Target location vectors (e.g., TLV in FIG. 9A) may be determined based on a direction-of-arrival estimation. The target location vector for each device may then be compared to the target selection vector in WCD coordinate system in order to select discovered devices that are potentially the target device from all of the other located devices. These devices, for example, may then be displayed graphically and/or textually on display 912 of WCD 100.

As previously set forth above, identification of located devices as potential target devices may be performed using direction-of-arrival estimation in conjunction with the defined target selection vector. More specifically, the target selection vector may approximate the direction or location (e.g., direction and distance) to the target device from WCD 100. This approximation may include an associated resolution that is depicted as the shaded area 910 in FIG. 9A, the resolution delimiting the area in which a target device must be located in order to be considered a potential target device. In this example, based on the resolution of approximation 910, only beacon 1 902 will most probably be included in the subset of potential target devices located and deemed within or near the approximate target location. Further, beacon 1 902 may be shown graphically on display 912 as falling within the target location vector target zone 910, and/or may be indicated textually by name, identification number, etc. so that user 110 may select it to establish a link. Alternatively, if beacon 1 902 is trusted (e.g., previously paired) then a wireless link may be automatically established between the wireless device and WCD 100.

Now referring to FIG. 9B, another example of the present invention is disclosed wherein the target selection vector is defined not to be in the same direction in which WCD is pointing. Instead, in this example the target selection vector is defined in an arbitrary direction. The direction or location indicated by the target selection vector may be established via different techniques, some examples of which are explained further below with respect to FIG. 14A to 14C. The process of defining the target selection vector may occur relatively simultaneously (as different resources may be utilized in WCD 100) or serially with the target location vector determination process. FIG. 9B further discloses an example where the target device location does not exactly correspond to the target location defined by the target selection vector. More specifically, the target location vector of beacon 1 902 and the target selection vector are not precisely aligned. However, since the target location vector of beacon 1 902 still falls within the resolution 910 of the target area, beacon 1 902 may be considered a potential target device to which a link may be established.

Figure 10:
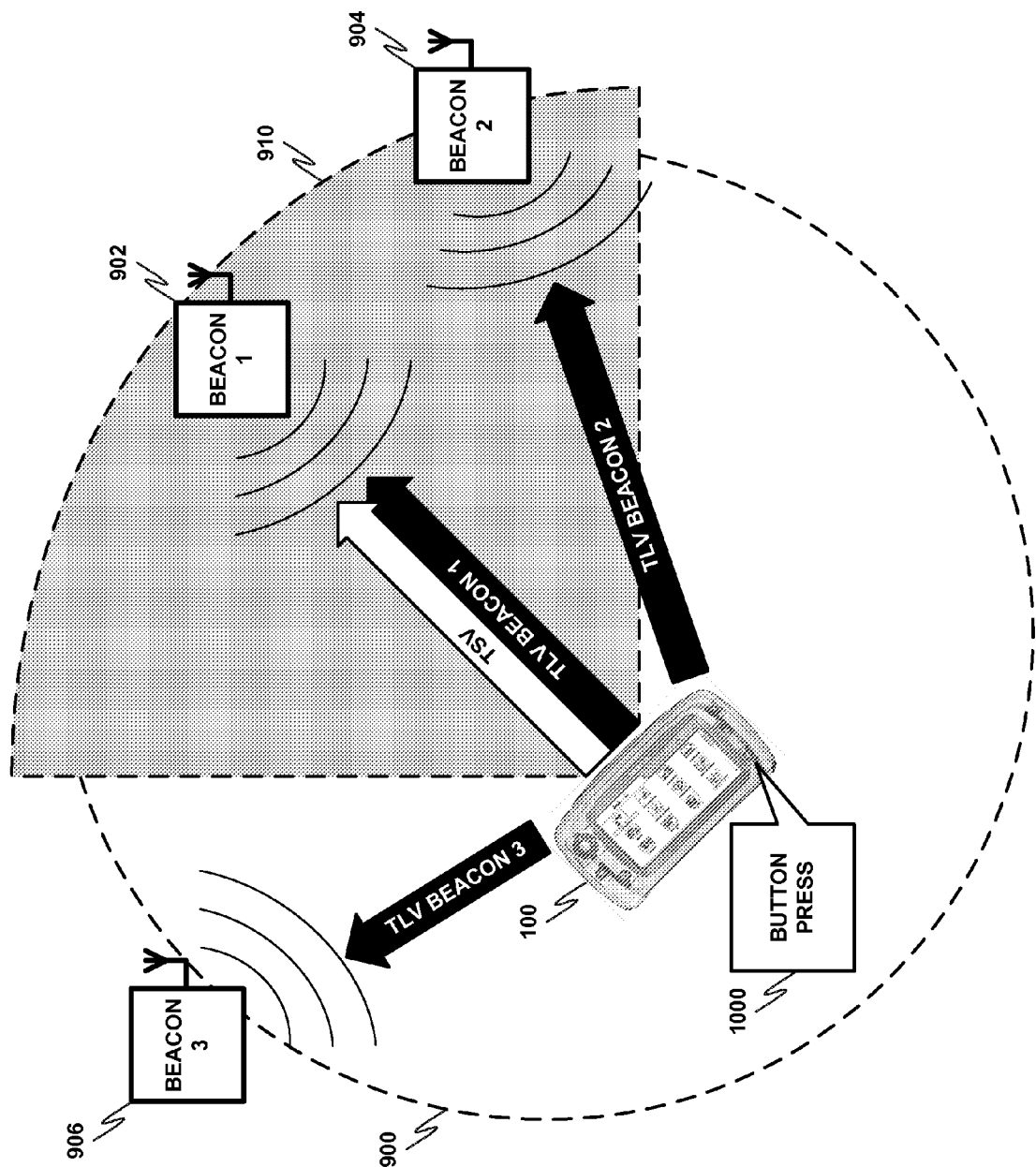
FIG. 10 discloses an exemplary target location vector determination initiated by a key press in accordance with at least one embodiment of the present invention.

FIG. 10 discloses an example of how target selection vector definition and target location vector determination may be initiated. In FIG. 10, user 110 may aim WCD 100 in the general direction of a target device to which a link is desired (e.g., towards beacon 1). User 110 may then initiate the target selection vector definition and target location vector determination process, for example through button or key press 1000, including all wireless-enabled devices within communication range of WCD 100. As a result of this process, a target selection vector may be defined, for example by the orientation of WCD 100 after the key or button is depressed, and target location vectors (TLV) for beacons 1-3 (items 902-906) may be determined. The defined target selection vector may then be compared to the target location vectors to determine if any of these devices falls within resolution 910. Further to the example disclosed in FIG. 10, an alternate option for initiating the target location vector determination may include moving WCD 100 from one location to another location through a movement recognizable by WCD 100 as a signal to initiate the previously described process. Any pattern of movement may be sensed by integrated mechanical, electromechanical or electronic motion or rotation sensors as known in the art, and recognized by WCD 100 as a predetermined signal indicating process activation.

Figure 11:
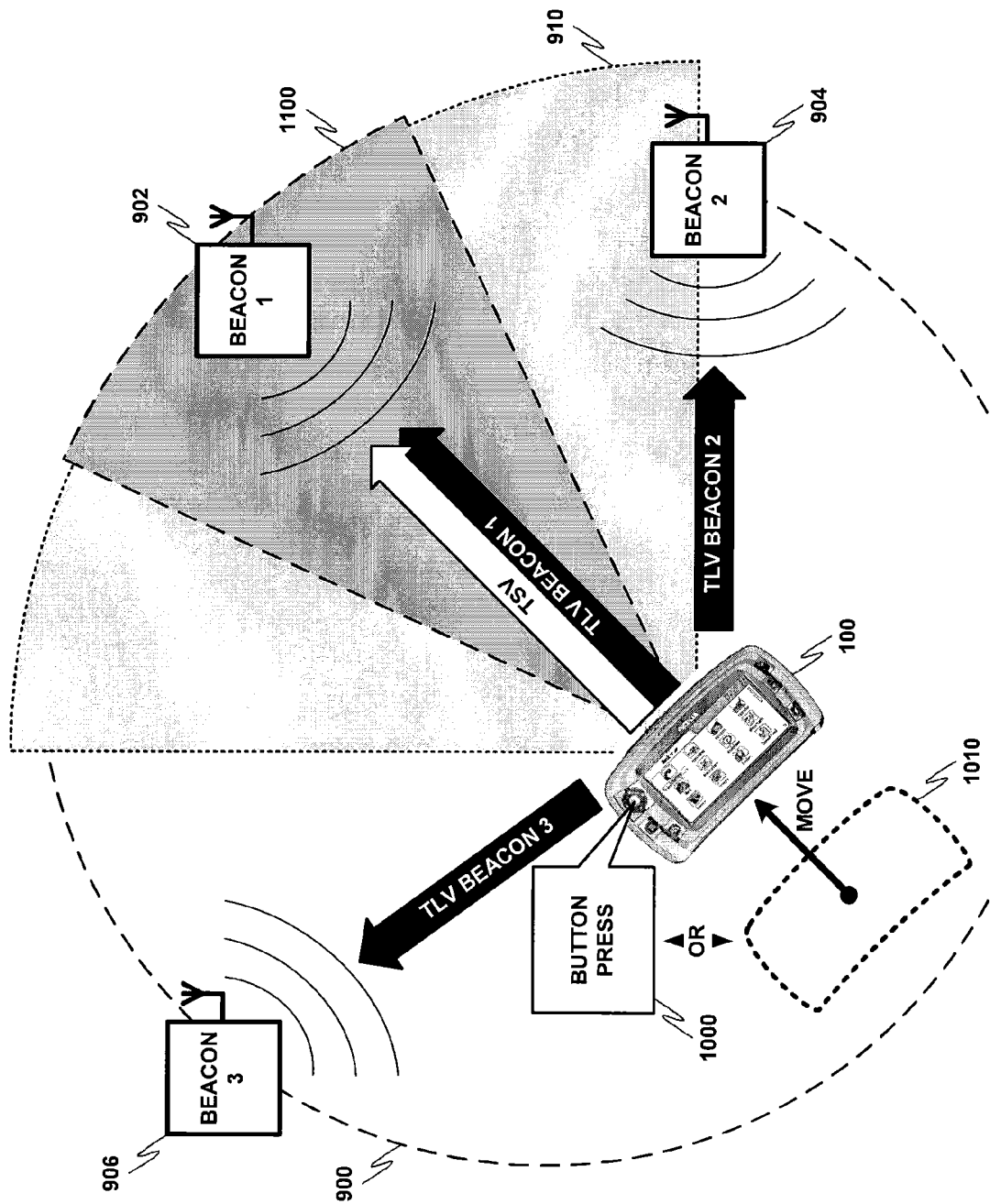
FIG. 11 discloses an example of the effect of refining the precision of a target location resolution in accordance with at least one embodiment of the present invention.

The resolution 910 of the target location area defined by the target selection vector may be determinative of how many located devices are deemed to be members of the subset of potential target devices. FIG. 11 discloses an example of how a narrower target location resolution 1100 may yield a different result than the examples of FIG. 9A-9B. Again, the defining/determination process may initiate through either a button press 1000 or movement trigger 1010. In this example, the previous direction-of-arrival estimation is indicated at 910 with a narrower resolution target area superimposed to demonstrate how a more precise resolution may reduce the number of potential target devices. Similar to the previous example, beacon 1 902 may be indicated as a potential target device. However, beacon 2 904 may now be excluded, making connection establishment to the targeted beacon 1 902 even easier. Further, if beacon 1 902 is determined to be a trusted device, the link may be established automatically upon discovery, removing the necessity for user 110 of having to interact with various menus.

The direction-of-arrival estimation may be determined in two dimensions, as disclosed in the previous examples, or may also be determined in three-dimensions to further increase the resolution of target device discovery. FIG. 12 discloses an example of direction-of-arrival estimation in three dimensions. Dimensions X, Y and Z in axes 1200 represent a three dimensional space. As previously set forth, the process may initiate through either a button press 1000 or movement trigger 1010. Not only may general direction towards a target device be accounted for in terms of the X and Z directions, but a Y direction component may also be utilized, for example, when translating the target selection vector from a coordinate system relative to WCD 100 to an absolute coordinate system. In view of the three-dimensional target selection vector, the resulting target area resolution disclosed as the combined areas 1210 and 1220 in FIG. 12 may form a three-dimensional target area in accordance with at least one embodiment of the present invention. Devices determined to be located in area 1210 via their target location vector may be given more weight (e.g., ordered first) in the potential target device subset than devices, for example, whose target location vector falls in shaded area 1220. As stated above with respect to the previous examples, the resolution of the target area may vary the size of areas 1210 and 1220, and hence, the number of potential target devices in the subset.

FIG. 13 now describes a situation where distance from the target device is also taken into consideration in computing the target selection vector. In this manner, not only may user 110 indicate a general direction towards a target device, but also an approximate distance to the target device from WCD 100. In accordance with at least one embodiment of the present invention, a user may orient WCD 100 to point towards the target device, and then depress and hold a button or key on WCD 100. This button or key press may then trigger sensors in WCD 100 to measure, a length of movement of WCD 100 (e.g., L1-L3 in FIG. 13). This movement may then be translated into an approximate distance (e.g., D1-D3) utilized for determining the distance component of the target selection vector. In the example disclosed in FIG. 13, WCD 100 may be oriented pointing towards beacon 2 904 when the target selection vector definition process commences (e.g., by a key or button being pressed and held). Then user 110 may then move WCD 100 towards beacon 2 904 a length of L2 (which may correspond to distance D2 per table 1900) to represent the approximate distance D2 from WCD 100 to beacon 2 904.

VII. Exemplary Connection Establishment

Figure 14A:
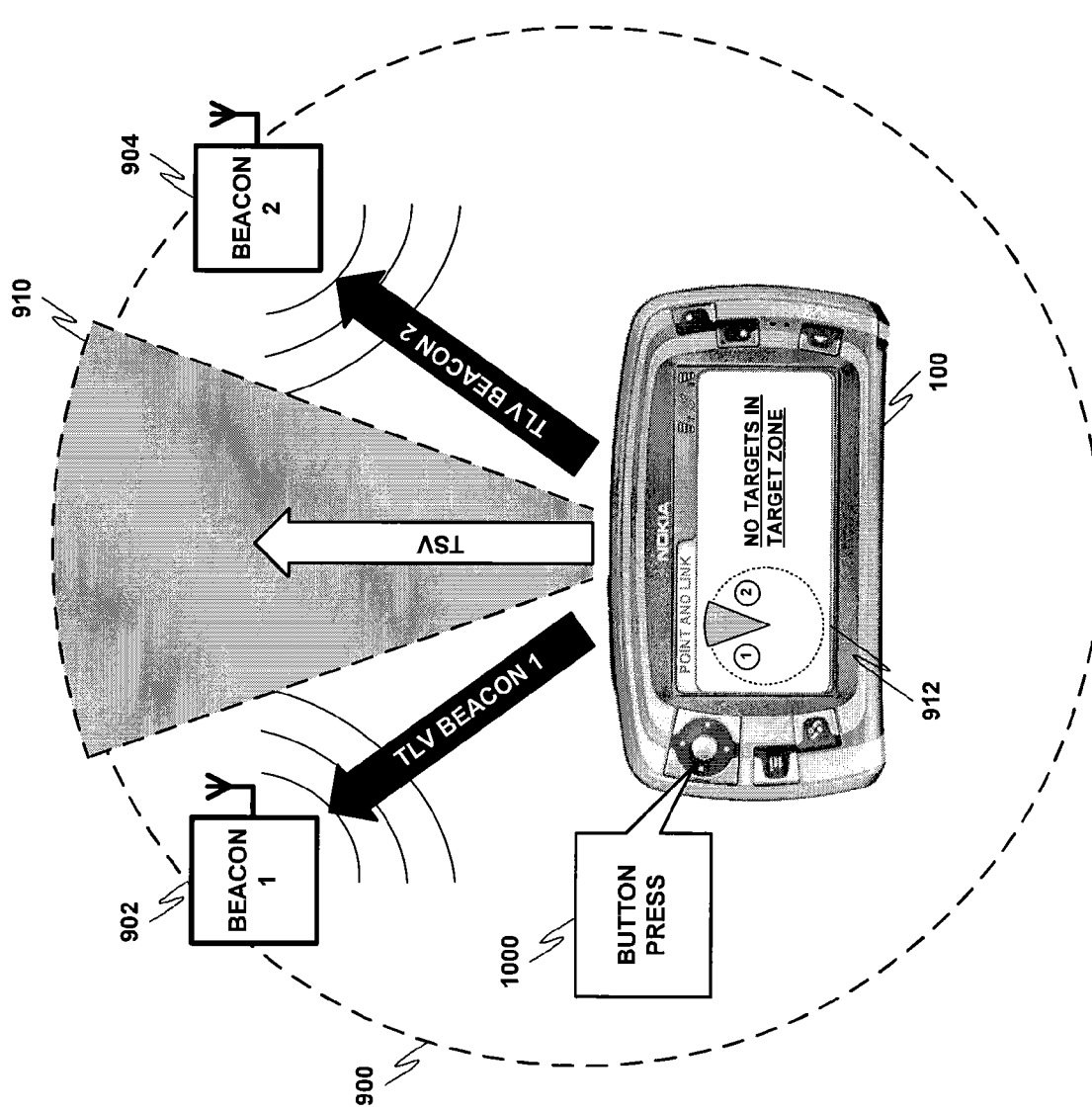
FIG. 14A discloses an example locating potential target devices in accordance with at least one embodiment of the present invention.
Figure 14B:
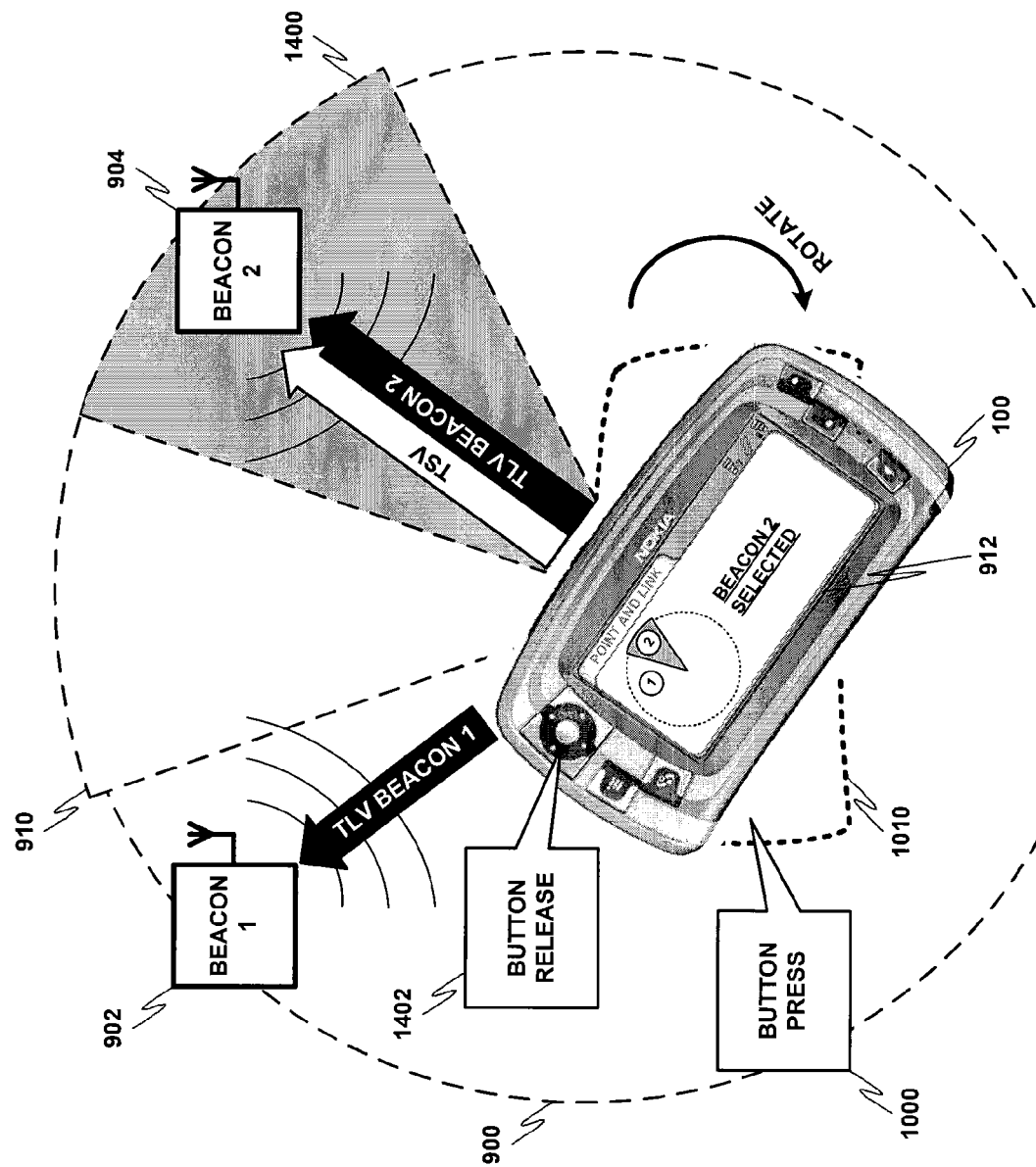
FIG. 14B discloses an example of utilizing rotation to select a target device with which to connect in accordance with at least one embodiment of the present invention.
Figure 14C:
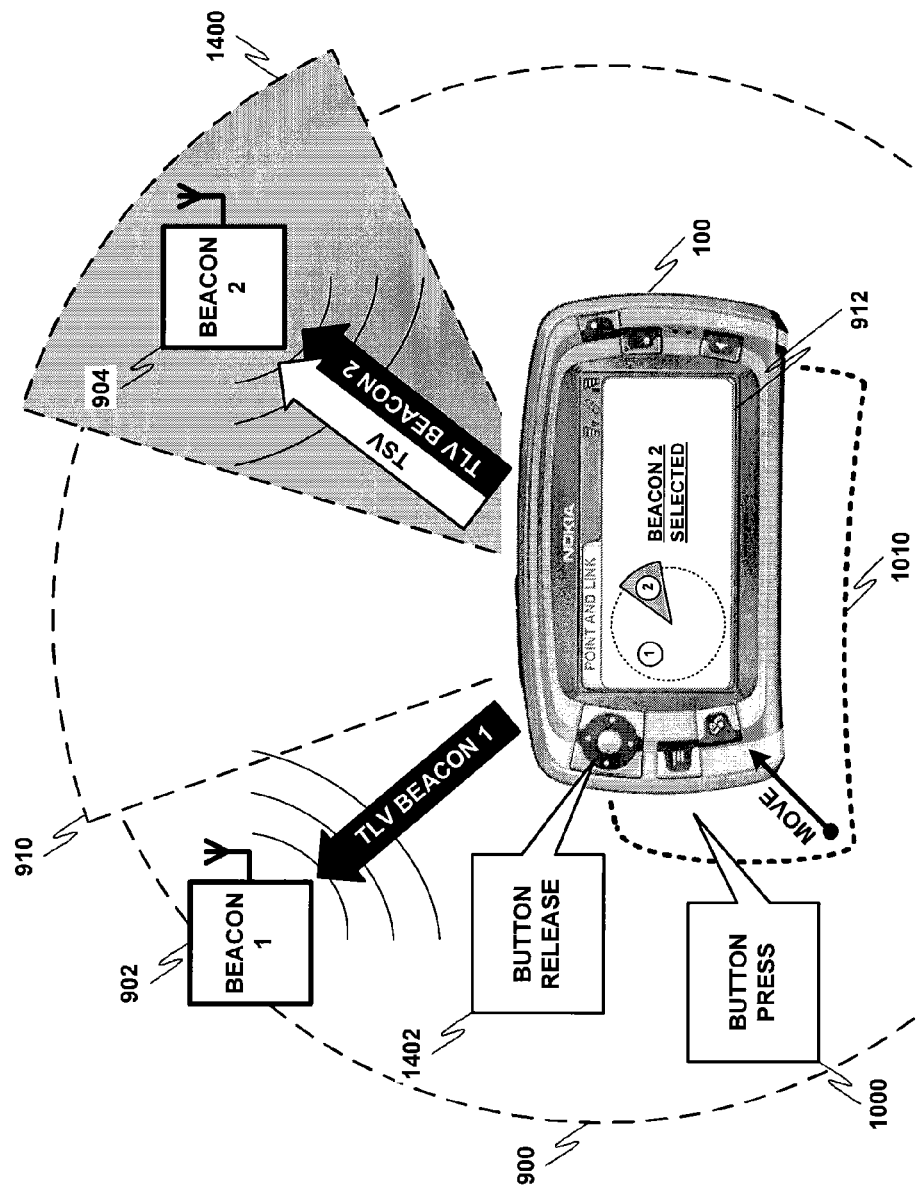
FIG. 14C discloses an example of utilizing movement to select a target device with which to connect in accordance with at least one embodiment of the present invention.

Now referring to FIG. 14A-14C, an exemplary connection establishment process is disclosed. FIG. 14A shows WCD 100 executing a direction-of-arrival determination in accordance with at least one embodiment of the present invention. The process disclosed in FIG. 14A may be used, for example, in a situation where user 110 is unaware of the wireless-enabled devices within communication range of WCD 100. As a result, user 110 may aim WCD 100 in a relatively arbitrary direction and then activate the process (e.g., via button press 1000) in order to determine the location of devices to which a connection may be established. In accordance with the exemplary target selection vector (TSV) and target location vector (TLV) processes disclosed above, target location vectors for beacon 1 902 and beacon 2 904 may compared to the target selection vector. Since the devices do not fall within location resolution 910, the devices may be shown on display 912 as outside the target zone, with no devices located within the target zone.

Now that the locations of beacon 1 902 and beacon 2 904 relative to WCD 100 are known, user 110 may then select a device with which to establish a connection. FIGS. 14B and 14C disclose two exemplary methods for selection. FIG. 14B discloses a scenario where user 110 rotates WCD 100 towards beacon 2 904 in order to establish a connection. The process may began when user 110 depresses and holds a button 1000 on WCD 100 to mark the starting orientation of WCD 100. WCD 100 may then be rotated from position 1010 to the orientation pointing towards beacon 2 904 as shown in FIG. 14B. This rotation may be measured by rotation sensors incorporated within WCD 100. When the device is oriented towards the target device, user 110 may release as disclosed at 1402. This action may indicate to WCD 100 that the rotation of the device may be measured, and new target selection and/or location vectors may be redefined based on the change in orientation. Since WCD 100 is now pointed towards beacon 2 904, the target selection vector and target location vector for beacon 2 904 may coincide (e.g., as shown at 1400), and display 912 may now indicate to user 110 that beacon 2 904 has been selected, or alternatively, may automatically establish a connection if beacon 2 904 is a trusted device. In an alternate embodiment of the present invention, no sensor to measure rotation is required. Instead, the pressing and releasing of a button on WCD 100 as disclosed at 1000 and 1402 may signal to discard the existing orientation-based target selection and/or location vectors, and that new vectors should be established based on the current orientation of WCD 100.

FIG. 14C discloses an exemplary process similar to 14B that now employs lateral motion of WCD 100 instead of rotation in order to redefine the target selection and/or location vectors. In this scenario, user 110 may initiate the process, for example by depressing and holding a button at 1000, while moving WCD 100. WCD 100 may be moved from starting location 1010 to where it is pictured in FIG. 14C, which is the relative direction towards beacon 2 904 from starting location 1010 in this example. When the button is released at 1402, the movement measured by position sensors, such as previously disclosed, may determine the direction of movement and redefine the target selection and/or location vector to approximate a new target area defined by 1400. Since the redefined target selection and/or target location vectors now coincide, display 912 may indicate that beacon 2 904 has been selected to user 110, or alternatively, may automatically establish a connection if beacon 2 904 is a trusted device.

Figure 15:
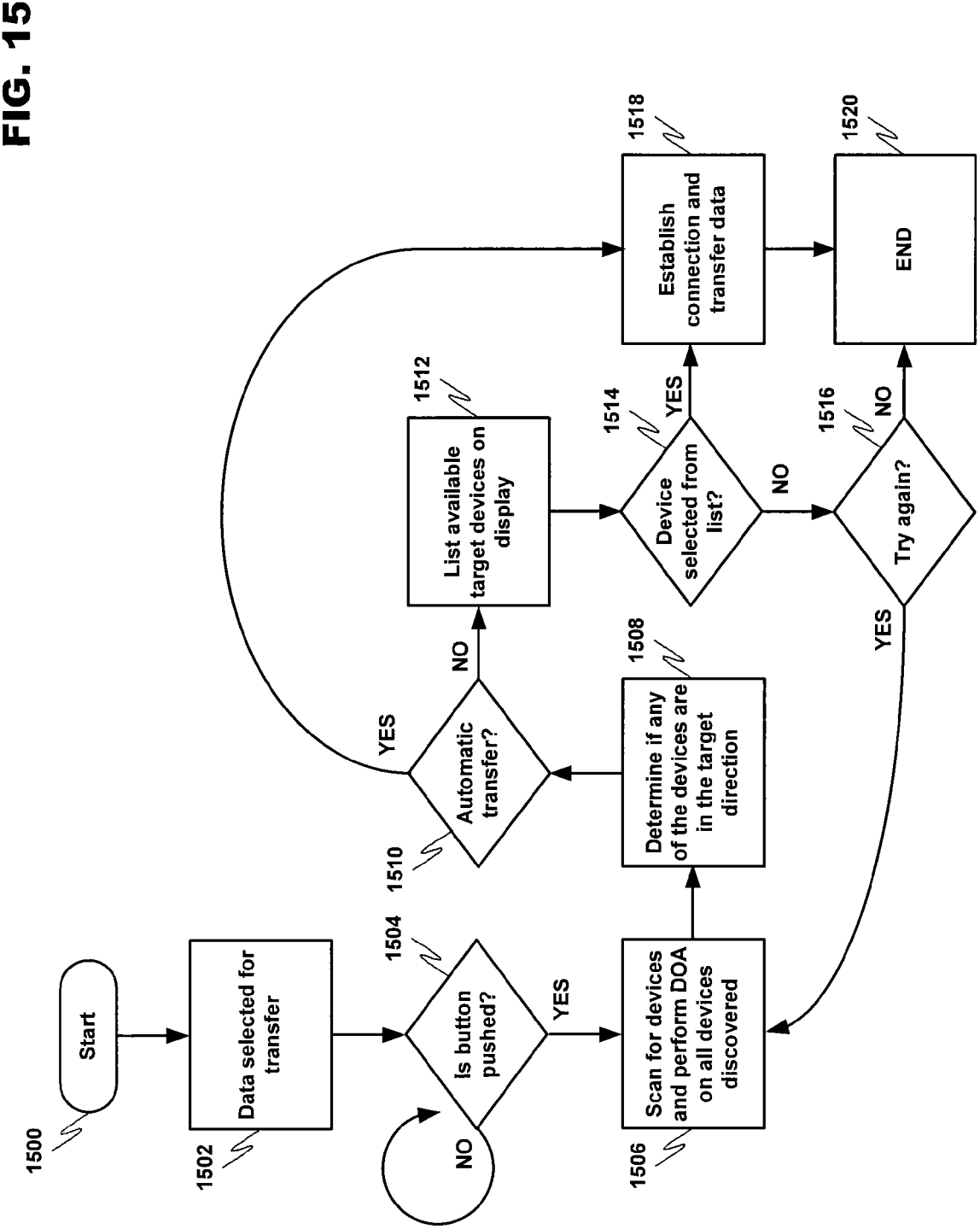
FIG. 15 discloses a flowchart for an exemplary location and discovery process in accordance with at least one embodiment of the present invention.

FIG. 15 discloses an exemplary process for establishing a connection with a target device for the purpose of transmitting information from a source (e.g., WCD 100) to the target device in accordance with at least one embodiment of the present invention. The process may initiate at 1500. Step 1502 then introduces into the process a scenario wherein there is data in WCD 100 awaiting wireless transfer to another device (e.g., the target device). It is important to note that this action is only used for the sake of example. The present invention should not be construed as limited only to the sending of data, but may instead be applicable to any activity requiring the establishment of a connection to another wireless-enabled device. The target selection/location determination process may then be suspended in step 1504 until triggered, for example, by a button being pressed and held in accordance with previous activation examples.

Once the process is triggered in step 1504, the direction towards the target device from WCD 100 and/or the distance of the target device from WCD 100 may be defined in order to compute a target selection vector. This process may occur in accordance with the previous examples, and may continue until user 110 indicates that the process is complete, for example, by releasing a held button. In step 1506 a device discovery scan may be performed in order to find wireless-enabled devices within range of WCD 100. A device discovery scan may provide information, such as identification information, to WCD 100. The information provided by any discovered devices may then be used to determine the location of the discovered devices (e.g., via direction-of-arrival estimation) with respect to WCD 100 (e.g., via a coordinate system with respect to WCD 100) and/or with respect to an absolute coordinate system. Once the location of the discovered devices is determined and a target location vector is computed for each device, each target location vector may be compared to the target selection vector in step 1508 in order to determine whether any of the devices fall within the defined resolution of the target area.

In step 1510 a determination may then be made as to whether any of the devices identified as being potential target devices (e.g., falling within the target area resolution in step 1508) support automatic connection establishment and transfer of information. If the automatic transfer process is both supported and permitted (e.g., from a security standpoint), then in step 1518 a connection may be established automatically (e.g., without further user intervention) and any data awaiting transmission may be sent. The process may then be completed in step 1520.

If automatic transfer is not permitted, user 110 may become involved to facilitate the communication link and transmission. In step 1512 a list of devices falling within the target area defined by the target selection vector may then be displayed for user 110 on WCD 100. As previously stated, the list may be ordered, for example, by the distance of each device from the target area indicated by the target selection vector. User 110 may then be asked to select at least one target device from the displayed list. If any desired target device is included in the list, user 110 may select this device in 1514. The connection to the target device may then be established in step 1518 and communication may proceed. The process may then be completed in step 1520.

Otherwise, if user 110 does not see any desired target device listed amongst the potential target devices on WCD 100 (step 1512), then user 110 may elect to begin the process over (step 1516), wherein a new scan for potential wireless-enabled devices within range of WCD 100 may be executed in step 1506. Otherwise, if user 110 does not desire to continue the process, then in step 1520 the process may terminate without communication to a target device.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
defining a target selection vector, the target selection vector being defined based on at least a direction from a wireless communication device towards a target device and a distance component corresponding to the distance from the wireless communication device to the target device, the distance component being defined by a distance that the wireless communication device is moved from the time the target selection vector determination is initiated until the time the target selection vector determination is completed;
computing location information for devices within communication range of the wireless communication device prior to establishing wireless networks including any of the devices within communication range and the wireless communication device, the location information including at least a target location vector for each device, based on a direction-of-arrival estimation determined with an antenna array in the wireless communication device;
determining a subset of potential target devices by comparing the target selection vector to the target location vector for each device; and
establishing a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

2. The method of claim 1, wherein defining a target selection vector is a process initiated by pressing a button on the wireless communication device.

3. The method of claim 1, wherein the direction from the wireless communication device towards the target device is defined by direction in which the wireless communication device is pointing during the target selection vector determination.

4. The method of claim 1, wherein the target selection vector indicates an approximate location of a target device based on the wireless communication device orientation information.

5. The method of claim 1, wherein computing location information for devices within communication range of the wireless communication device location includes calculating the target location vector of each device based on a direction-of-arrival estimation.

6. The method of claim 5, wherein the direction-of-arrival estimation determines the discovered potential target devices in a two-dimensional approximate target area.

7. The method of claim 5, wherein the direction-of-arrival estimation determines the discovered potential target devices in a three-dimensional approximate target area.

8. The method of claim 1, further comprising displaying the subset on the wireless communication device in a listing, wherein the devices are displayed in order by proximity to a target location defined by the target selection vector.

9. The method of claim 1, wherein establishing a wireless link to at least one of the devices in the subset of potential target devices occurs automatically.

10. A computer program product comprising a tangible, non-transitory computer usable medium having computer readable program code embodied in said medium, comprising:
a computer readable program code configured to define a target selection vector, the target selection vector being defined based on at least a direction from a wireless communication device towards a target device and a distance component corresponding to the distance from the wireless communication device to the target device, the distance component being defined by a distance that the wireless communication device is moved from the time the target selection vector determination is initiated until the time the target selection vector determination is completed;
a computer readable program code configured to compute location information for devices within communication range of the wireless communication device prior to establishing wireless networks including any of the devices within communication range and the wireless communication device, the location information including at least a target location vector for each device, based on a direction-of-arrival estimation determined with an antenna array in the wireless communication device;

a computer readable program code configured to determine a subset of potential target devices by comparing the target selection vector to the target location vector for each device; and a computer readable program code configured to establish a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

11. The computer program product of claim 10, wherein defining a target selection vector is a process initiated by pressing a button on the wireless communication device.

12. The computer program product of claim 10, wherein the direction from the wireless communication device towards the target device is defined by direction in which the wireless communication device is pointing during the target selection vector determination.

13. The computer program product of claim 10, wherein the target selection vector indicates an approximate location of a target device based on the wireless communication device orientation information.

14. The computer program product of claim 10, wherein computing location information for devices within communication range of the wireless communication device location includes calculating the target location vector of each device based on a direction-of-arrival estimation.

15. The computer program product of claim 14, wherein the direction-of-arrival estimation determines the discovered potential target devices in a two-dimensional approximate target area.

16. The computer program product of claim 14, wherein the direction-of-arrival estimation determines the discovered potential target devices in a three-dimensional approximate target area.

17. The computer program product of claim 10, further comprising displaying the subset on the wireless communication device in a listing, wherein the devices are displayed in order by proximity to a target location defined by the target selection vector.

18. The computer program product of claim 10, wherein establishing a wireless link to at least one of the devices in the subset of potential target devices occurs automatically.

19. A wireless communication device, comprising:
at least one processor;
at least one communication module coupled to the at least one processor;
at least one sensor for determining device orientation coupled to the at least one processor;
at least one set of hardware required for direction-of-arrival determination coupled to the processor;
wherein the device is configured to:
define a target selection vector, the target selection vector being defined based on at least a direction from the wireless communication device towards a target device and a distance component corresponding to the distance from the wireless communication device to the target device, the distance component being defined by a distance that the wireless communication device is moved from the time the target selection vector determination is initiated until the time the target selection vector determination is completed;
compute location information for devices within communication range of the wireless communication device prior to establishing wireless networks including any of the devices within communication range and the wireless communication device, the location information including at least a target location vector for each device, based on a direction-of-arrival estimation determined with an antenna array in the wireless communication device;
determine a subset of potential target devices by comparing the target selection vector to the target location vector for each device; and
establish a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

20. The device of claim 19, wherein initiating a target location vector determination includes pressing a button on the device.

21. A circuit, comprising:
at least one processor;
at least one communication module coupled to the at least one processor;
at least one sensor for determining circuit orientation coupled to the at least one processor;
at least one set of hardware required for direction-of-arrival determination coupled to the processor;
wherein the circuit is configured to:
define a target selection vector, the target selection vector being defined based on at least a direction from the circuit towards a target device and a distance component corresponding to the distance from the circuit to the target device, the distance component being defined by a distance that the circuit is moved from the time the target selection vector determination is initiated until the time the target selection vector determination is completed;
compute location information for devices within communication range of a wireless communication device including the circuit via direction-of arrival determination and prior to establishing wireless networks including any of the devices within communication range and the wireless communication device, the location information including at least a target location vector for each device, based on a direction-of-arrival estimation determined with an antenna array in the wireless communication device;
determine a subset of potential target devices by comparing the target selection vector to the target location vector for each device; and
establish a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

22. The circuit of claim 21, wherein the circuit is a sub-part of a wireless communication device.

23. The circuit of claim 21, wherein the direction-of-arrival estimation determines the discovered potential target devices in a two-dimensional approximate target area.

24. The circuit of claim 21, wherein the direction-of-arrival estimation determines the discovered potential target devices in a three-dimensional approximate target area.

25. The circuit of claim 21, further comprising a display, coupled to the at least one processor, for displaying the subset on the wireless communication device in a listing, wherein the devices are displayed in order by proximity to a target location defined by the target selection vector.

26. A wireless communication device, comprising:
means for defining a target selection vector, the target selection vector being defined based on at least a direction from the wireless communication device towards a target device and a distance component corresponding to the distance from the wireless communication device to the target device, the distance component being defined by a distance that the wireless communication device is moved from the time the target selection vector determination is initiated until the time the target selection vector determination is completed;
means for computing location information for devices within communication range of the wireless communication device prior to establishing wireless networks including any of the devices within communication range and the wireless communication device, the location information including at least a target location vector for each device, based on a direction-of-arrival estimation determined with an antenna array in the wireless communication device;
means for determining a subset of potential target devices by comparing the target selection vector to the target location vector for each device; and
means for establishing a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

27. The device of claim 26, wherein the target selection vector indicates an approximate location of a target device based on the wireless communication device orientation information.

28. The device of claim 26, wherein computing location information for devices within communication range of the wireless communication device location includes calculating the target location vector of each device based on a direction-of-arrival estimation.

29. A circuit, comprising:
at least one sensor and at least one processor configured for defining a target selection vector, the target selection vector being defined based on at least a direction from the circuit towards a target device and a distance component corresponding to the distance from the circuit to the target device, the distance component being defined by a distance that the circuit is moved from the time the target selection vector determination is initiated until the time the target selection vector determination is completed;
at least one direction-of-arrival module configured for computing location information for devices within communication range of a wireless communication device including the circuit prior to establishing wireless networks including any of the devices within communication range and the wireless communication device, the location information including at least a target location vector for each device, based on a direction-of-arrival estimation determined with an antenna array in the wireless communication device;
the at least one processor further configured for determining a subset of potential target devices by comparing the target selection vector to the target location vector for each device; and
at least one wireless communication module configured for establishing a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

30. The circuit of claim 29, wherein the circuit is a sub-part of a wireless communication device.

31. A wireless communication device, comprising:
means configured for defining a target selection vector, the target selection vector being defined based on at least a direction from the wireless communication device towards a target device and the distance from the wireless communication device to the target device, the distance being defined by a distance that the wireless communication device is moved from the time the target selection vector determination is initiated until the time the target selection vector determination is completed;
means configured for computing location information for devices within communication range of the wireless communication device prior to establishing wireless networks including any of the devices within communication range and the wireless communication device, the location information including at least a target location vector for each device, based on a direction-of-arrival estimation determined with an antenna array in the wireless communication device;
means configured for determining a subset of potential target devices by comparing the target selection vector to the target location vector for each device; and
means configured for establishing a wireless network including at least one of the devices in the subset of potential target devices and the wireless communication device wherein the direction from the wireless communication device towards the target device is defined by a distance that the wireless communication device is rotated from the time the target selection vector determination is initiated until the time the target selection vector determination is completed.

* * * * *